US007844055B2

(12) United States Patent
Mukherjee et al.

(10) Patent No.: US 7,844,055 B2
(45) Date of Patent: Nov. 30, 2010

(54) DETECTING AND TRANSPORTING DYNAMIC PRESENCE INFORMATION OVER A WIRELESS AND WIRELINE COMMUNICATIONS NETWORK

(75) Inventors: Atanu Mukherjee, Bellevue, WA (US); Francois Frederic Ozog, Adainville (FR); Chao-Chi Chen, Sammamish, WA (US)

(73) Assignee: Link US All, LLC, Reno, NV (US)

( * ) Notice: Subject to any disclaimer, the term of this patent is extended or adjusted under 35 U.S.C. 154(b) by 1159 days.

(21) Appl. No.: 10/180,636

(22) Filed: Jun. 25, 2002

(65) Prior Publication Data

US 2003/0073440 A1      Apr. 17, 2003

Related U.S. Application Data

(60) Provisional application No. 60/301,246, filed on Jun. 26, 2001, provisional application No. 60/301,249, filed on Jun. 26, 2001.

(51) Int. Cl.
  *G06F 15/16* (2006.01)
  *H04W 4/00* (2009.01)
  *H04W 36/00* (2009.01)
(52) U.S. Cl. .................. 380/250; 709/204; 709/206; 709/220; 455/435.1; 455/439; 455/440
(58) Field of Classification Search ............ 380/250
  See application file for complete search history.

(56) References Cited

U.S. PATENT DOCUMENTS 5,289,179 A    2/1994  Beeson, Jr. et al. .......... 340/826

5,309,501 A    5/1994  Kozik et al. ................... 379/58
5,329,573 A    7/1994  Chang et al. .................. 379/58

(Continued)

FOREIGN PATENT DOCUMENTS

EP    1 071 295    1/2001

(Continued)

OTHER PUBLICATIONS

Paul, S., Ayanoglu, E., La Porta, T.F., Chen, K-W.H., Sabnani, K.K., Gitlin, R.D. "An Asymmetric Protocol for Digital Cellular Communications". Infocom '95. Pub. Date: Apr. 1995. Relevant Pages: 1053-1062. Found on the World Wide Web at: http://ieeexplore.ieee.org/stamp/stamp.jsp?tp=&arnumber=515982.*

(Continued)

*Primary Examiner*—Christopher A Revak
*Assistant Examiner*—Jeremiah Avery
(74) *Attorney, Agent, or Firm*—Buchanan Ingersoll & Rooney PC

(57) ABSTRACT

A method for detecting and transporting dynamic presence information over a wireless and wireline communications network comprises determining client device capabilities relating to user presence information that may be obtained from the client device and determining a presence configuration of the client device. The presence configuration defines information to be provided to a presence agent. The presence configuration also defines one or more action to be performed upon notification of an event occurrence. The method also includes collecting dynamic presence information based at least in part on the client device capabilities and the presence configuration.

38 Claims, 20 Drawing Sheets

U.S. PATENT DOCUMENTS

| | | | | |
|---|---|---|---|---|
| 5,889,474 | A | 3/1999 | LaDue | 340/825.49 |
| 6,161,008 | A * | 12/2000 | Lee et al. | 455/415 |
| 6,185,208 | B1 | 2/2001 | Liao | 370/392 |
| 6,208,633 | B1 | 3/2001 | Jouppila et al. | 370/338 |
| 6,226,277 | B1 | 5/2001 | Chuah | 370/328 |
| 6,301,609 | B1 * | 10/2001 | Aravamudan et al. | 709/207 |
| 6,516,197 | B2 * | 2/2003 | Havinis et al. | 455/456.1 |
| 6,600,735 | B1 * | 7/2003 | Iwama et al. | 370/352 |
| 6,658,011 | B1 | 12/2003 | Sevanto et al. | 370/401 |
| 6,680,943 | B1 * | 1/2004 | Gibson et al. | 370/392 |
| 6,694,429 | B1 * | 2/2004 | Kalmanek et al. | 713/153 |
| 6,804,558 | B2 * | 10/2004 | Haller et al. | 607/30 |
| 6,807,423 | B1 * | 10/2004 | Armstrong et al. | 455/440 |
| 6,826,403 | B1 * | 11/2004 | Minborg et al. | 455/445 |
| 6,834,195 | B2 * | 12/2004 | Brandenberg et al. | 455/456.3 |
| 6,917,610 | B1 * | 7/2005 | Kung et al. | 370/352 |
| 6,940,847 | B1 * | 9/2005 | Glitho et al. | 370/352 |
| 6,996,076 | B1 * | 2/2006 | Forbes et al. | 370/310 |
| 7,149,773 | B2 * | 12/2006 | Haller et al. | 709/203 |
| 7,366,303 | B2 * | 4/2008 | Flykt et al. | 380/247 |
| 7,448,072 | B2 * | 11/2008 | Faccin et al. | 726/4 |
| 2001/0051787 | A1 * | 12/2001 | Haller et al. | 604/66 |
| 2002/0013613 | A1 * | 1/2002 | Haller et al. | 607/60 |
| 2002/0052539 | A1 * | 5/2002 | Haller et al. | 600/300 |
| 2002/0077116 | A1 * | 6/2002 | Havinis et al. | 455/456 |
| 2002/0082665 | A1 * | 6/2002 | Haller et al. | 607/60 |
| 2003/0018704 | A1 * | 1/2003 | Polychronidis et al. | 709/202 |

FOREIGN PATENT DOCUMENTS

| | | | | |
|---|---|---|---|---|
| EP | 1071295 | A2 * | 1/2001 | 340/10.1 |
| EP | 1 104 964 | | 6/2001 | |
| WO | 00/64110 | | 10/2000 | |

OTHER PUBLICATIONS

International Search Report, PCT/US02/20222, date mailed Feb. 6, 2003.
Written Opinion, PCT/US02/20222, date mailed Mar. 17, 2005.
International Preliminary Report, PCT/US02/20222, date mailed Aug. 17, 2005.
Written Opinion, PCT/US02/20305, date mailed Apr. 26, 2004.
International Preliminary Examination Report, PCT/US02/20305, date of mailing Sep. 9, 2004.
Hotsip, Mobile Presence Bringing You Closer, Jun. 2001, printed from www.hotsip.com/documents/mobile_presence_white_paper.pdf on Jan. 17, 2003.
Hotsip, "Mobile Presence Based on SIP Proves Successful", Jun. 19, 2001, printed from www.hotsip.corn/news/one.asp?id=1270&showinfotype=news, on Jan. 17, 2003.
Internet Engineering Task Force Internet Draft, "SIP Extensions for Presence", Mar. 2, 2001, pp. 1-39.
Hotsip News, "News", printed from www.hotsip.corn/news/>, on Jan. 17, 2003.
PCT International Search Report, PCT/US 02/20305, International filing date Jun. 25, 2002, date Search Report mailed Apr. 22, 2003.
Antonella Napolitano, et al., "Evolution of the GSM Platform", 1998, p. 409-413.
Insik Hong, et al., "The Implementation of Electronic Money for E-Commerce Using Java Card", 2001, p. 1369-1372.
International Search Report, PCT/US02/20305, International filing date Jun. 25, 2002.
CDMA Development Group, "*Smart Card Stage I Description*", ver. 1.1, Document#43, May 22. 1996.
3GPP, "*3rd Generation Partnership Project; Technical Specification Group Terminals; USIM and IC card Requirements*", version 4.0, 2001, pp. 1-14.
3GPP2, "*Removable User Identity Module (R-UIM) for cdma2000 Spread Spectrum Systems*", Jun. 9, 2000, pp. 1-97.
"Smart Card Stage I Description", Version 1.1, May 22, 1996.
"Wireless Identity Module", Version 12-Jul. 2001.
3GPP TS 21.111 Version 4.0.0, USIM and IC Card Requirements, pp. 1-20.
Removable User Identity Module (R-UIM) for cdma 2000 Spread Spectum Systems (3GPP2 C.S0023-0), Jun. 9, 2000.
"Java Card™2.1 Runtime Environment (JCRE) Specification", Jun. 7, 1999, Final Revision 1.1.
Digital cellular telecommunications system (Phase 2+); Specification of the SIM Application Toolkit for the Subscriber Identity Module—Mobile Equipment (SIM-ME) interface (GSM 11.14 Version 5.2.0), Dec. 1996, pp. 1-56.
(GSM 11.11 version 5.0.0) Dec. 1995, pp. 33-37.
M. Handley et al. "SIP: Session Initiation Protocol" RFC2543, Mar. 1999, pp. 1-90.
Information technology—Identification cards—Integrated circuit(s) cards with contacts— "Electronic signals and transmission protocols" Part 3, International Standard ISO/IEC 7816-3:1997(E), pp. i-iv, & 1-28.
G. Richter, "A Study of the SIM Application Toolkit", Nov. 2001, EPN820 Advanced Computer Networks, pp. 1-121.
(GSM 03.40 version 7.4.0 Release 1998) Digital cellular Telecommunications system (Phase 2+); Technical realization of the Short Message Service (SMS), pp. 1-59.

* cited by examiner

Buddy List

| Name | Status | Phone Contacts | SMS Contacts |
|---|---|---|---|
| Atanu | Idle | | |
| Matt | Busy | | |
| Mike | Idle | | |
| Sue | Active | | |
| Bill | Idle | | |
| Bobb | Engaged | | |
| Mary | Sleep | | |
| Jane | Idle | | |
| Ed | Active | | |
| Sam | Idle | | |

Configuration File

```
Username: Yanx
Password: Xxxx
Home Server: Versada1.versadanet.com
Outbound Port Number: 5061
Inbound Port Number: 5062
Register Duration 36000
Device ID: 1234567890
Contact: Sip:yanx@CB2ZRV201.VERSADA.centerbeam.com;devicer="desktop"; q=0.5
Contact: Mailto:yanx@versadanet.com; q=1
```

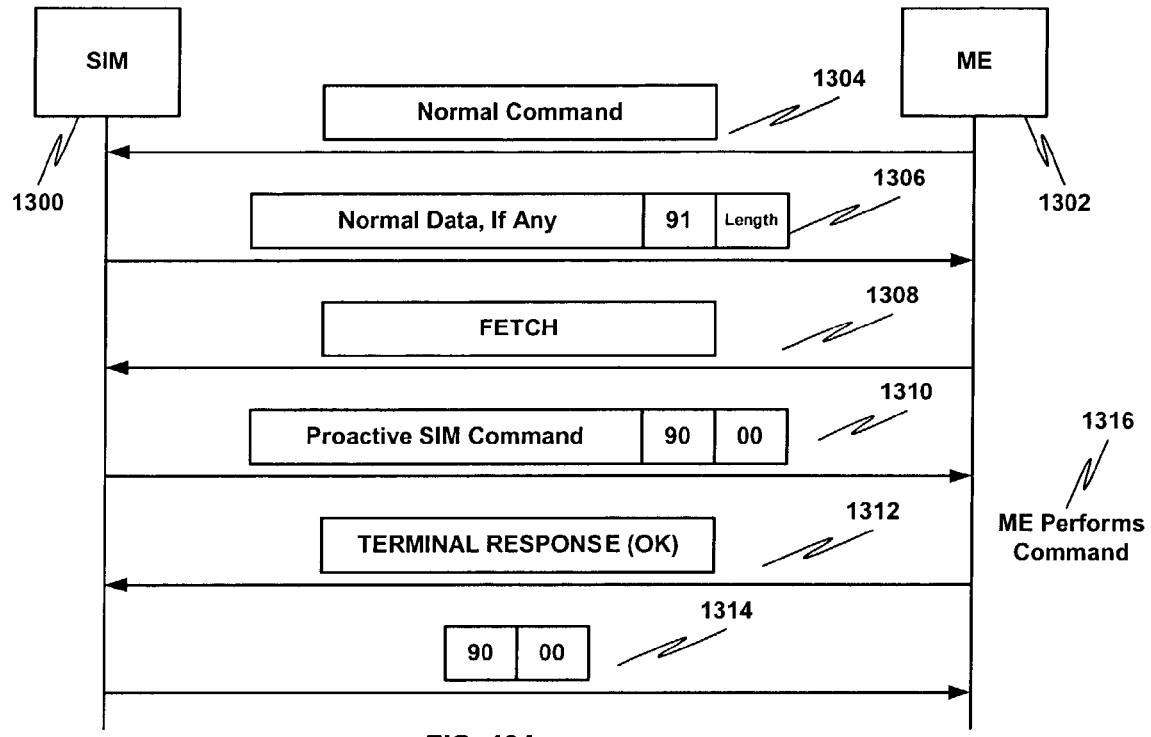
FIG. 13A
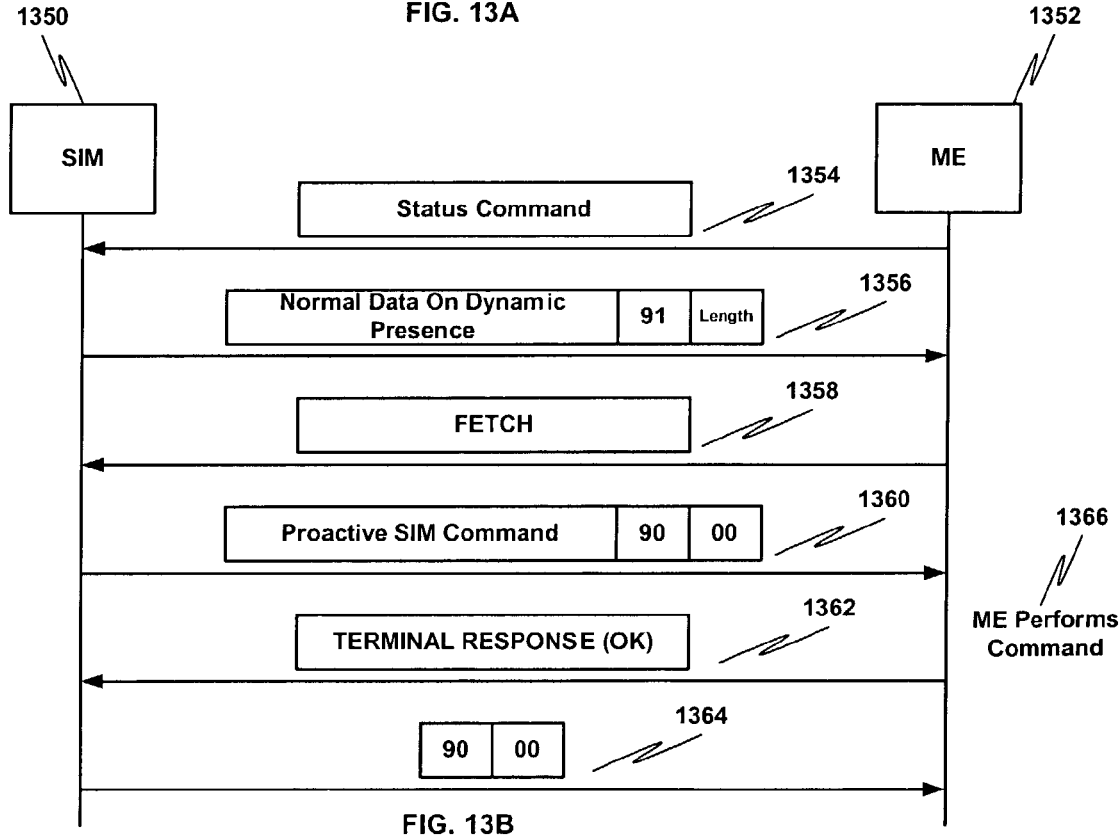
FIG. 13B
FIG. 13

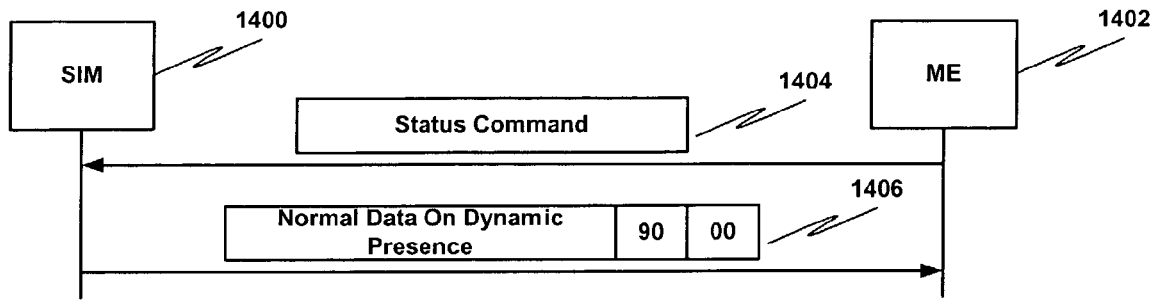
FIG. 14A
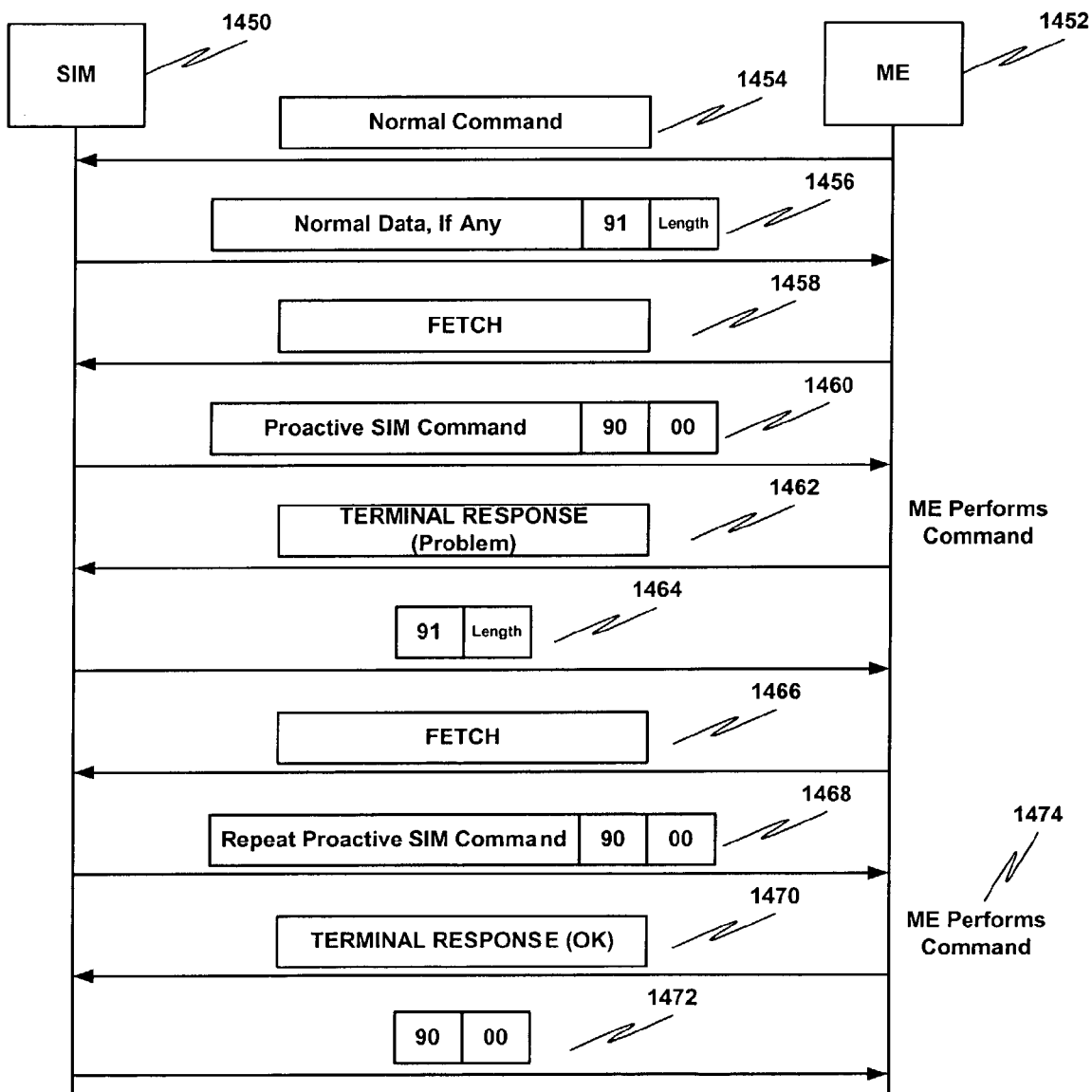
FIG. 14B
FIG. 14

DETECTING AND TRANSPORTING DYNAMIC PRESENCE INFORMATION OVER A WIRELESS AND WIRELINE COMMUNICATIONS NETWORK

CROSS REFERENCE TO RELATED APPLICATIONS

This application claims the benefit of provisional patent application No. 60/301,246 filed Jun. 26, 2001, entitled "Architecture And Protocol Mechanisms For Detecting And Transmitting Dynamic Presence Information Using The SIM Specifications And SMS Packet Transport Over GSM Networks Using Abbreviated SIP Stack Grammer".

This application claims the benefit of provisional patent application No. 60/301,249 filed Jun. 26, 2001, entitled "An Architecture For Transcoding SMS Based Streamed Messages To SIP Based IP Signals In Wireless And Wireline Networks".

This application is related to the following: U.S. patent application Ser. No. 10/183,031, filed Jun. 25, 2002, "Transcoding SMS-Based Streamed Messages To SIP-Based IP Signals In Wireless And Wireline Networks", commonly assigned herewith.

FIELD OF THE INVENTION

The present invention relates to the field of computer science. More particularly, the present invention relates to a method and apparatus for detecting and transporting dynamic presence information over a data communications network.

BACKGROUND OF THE INVENTION

Presence information is defined as the state of a user as it relates to his or her interaction with various user devices such as mobile phones and the end applications that execute on the user devices. Examples of end applications include communication, gaming and alerting applications.

In the "wired" line network, the Internet Protocol (IP) network is mature and available to most desktop computing devices. However, in the wireless world, a packet-switched IP network is available to relatively few devices and relatively few markets. Second generation (2G) mobile phones typically offer Web-browsing capabilities via WAP (Wireless Area Protocol) services. Unfortunately, these services are typically implemented in a circuit-switched fashion. True IP-based packet-switched data services will be unavailable until 2.5G or third generation (3G) infrastructures are deployed widely.

Accordingly, there is a need to gather and distribute presence information from wireless devices. There is a further need for such a solution that gathers and distributes presence information from 2G GSM mobile devices. There is a further need for such a solution that is relatively non-intrusive. There is a further need for such a solution that is relatively straightforward to implement using well-understood standards.

SUMMARY OF THE INVENTION

A method for detecting and transporting dynamic presence information over a wireless and wireline communications network comprises determining client device capabilities relating to user presence information that may be obtained from the client device and determining a presence configuration of the client device. The presence configuration defines information to be provided to a presence agent. The presence configuration also defines one or more action to be performed upon notification of an event occurrence. The method also includes collecting dynamic presence information based at least in part on the client device capabilities and the presence configuration.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIG. 7A is a block diagram that illustrates a buddy list in accordance with one embodiment of the present invention.

FIG. 7B is a block diagram that illustrates a configuration file in accordance with one embodiment of the present invention.

FIG. 13A is an event sequence diagram that illustrates using a proactive SIM request for dynamic presence data responsive to a normal command from a mobile phone in accordance with one embodiment of the present invention.

FIG. 13B is an event sequence diagram that illustrates using a proactive SIM request for dynamic presence data responsive to a status command from a mobile in accordance with one embodiment of the present invention.

FIG. 14A is an event sequence diagram that illustrates a status command from a mobile phone that is not followed by a proactive SIM request.

FIG. 14B is an event sequence diagram that illustrates repeating an unsuccessful proactive SIM request for dynamic presence data in accordance with one embodiment of the present invention.

DETAILED DESCRIPTION

Figure 1:
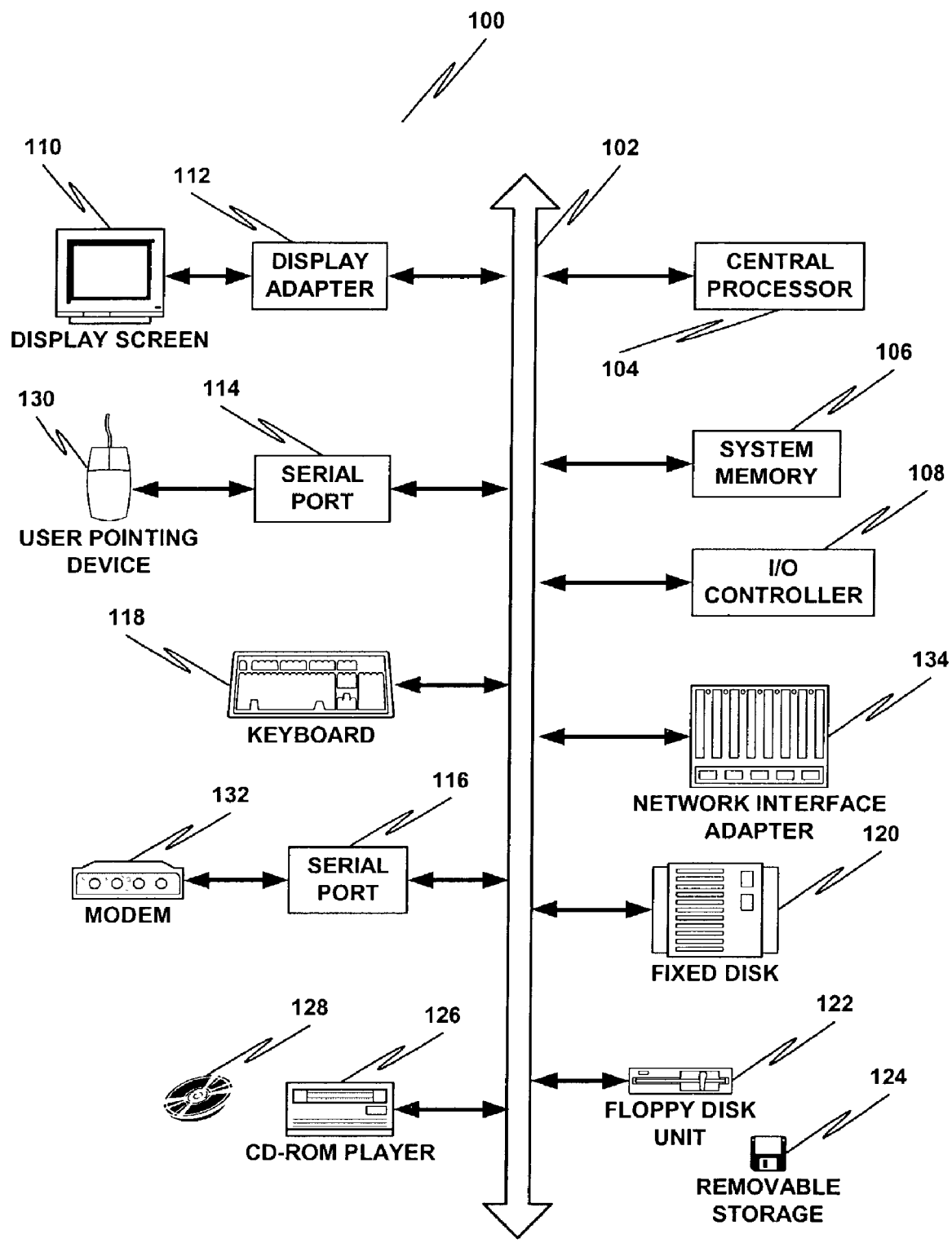
FIG. 1 is a block diagram of a computer system suitable for implementing aspects of the present invention.

Embodiments of the present invention are described herein in the context of a method and apparatus for detecting and transporting dynamic presence information over a wireless and wireline communications network. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

In the context of the present invention, the term "Presence" is defined as the subscription to and notification of changes in communication states of a user, where the communication states comprise of a set of communication means, such as communication devices, location, willingness to communicate, preferences and the personal state of the user. Examples of presence information include, by way of example, on-line status, physical location (home, office, café) and currently preferred contact (e.g. phone, text messaging, email)

In the context of the present invention, the term "principal" is defined as a provider and/or consumer of presence information. A principal may comprises, by way of example, a human, a device, a presence application, a presence-technology enabled system such as an airplane, or the like.

In the context of the present invention, the term "principal object" includes profile information, contact information, capability information, preference information and presence information.

In the context of the present invention, the term "profile" represents static information about a principal. Examples include, by way of example, a social security number, a home address, date of birth, or the like.

In the context of the present invention, the "capability" of a principal refers to a capability of a device associated with the principal.

In the context of the present invention, the term "watcher" is defined as a principal that fetches or subscribes to another principal's presence information.

In accordance with one embodiment of the present invention, the components, processes and/or data structures may be implemented using C or C++ programs running on high performance computers (such as an Enterprise 2000™ server running Sun Solaris™ as its operating system. The Enterprise 2000™ server and Sun Solaris™ operating system are products available from Sun Microsystems, Inc. of Palo Alto, Calif.). Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

FIG. 1 depicts a block diagram of a computer system 100 suitable for implementing aspects of the present invention. As shown in FIG. 1, computer system 100 includes a bus 102 which interconnects major subsystems such as a central processor 104, a system memory 106 (typically RAM), an input/output (110) controller 108, an external device such as a display screen 110 via display adapter 112, serial ports 114 and 116, a keyboard 118, a fixed disk drive 120, a floppy disk drive 122 operative to receive a floppy disk 124, and a CD-ROM player 126 operative to receive a CD-ROM 128. Many other devices can be connected, such as a pointing device 130 (e.g., a mouse) connected via serial port 114 and a modem 132 connected via serial port 116. Modem 132 may provide a direct connection to a server via a telephone link or to the Internet via a POP (point of presence). Alternatively, a network interface adapter 134 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 1 to be present to practice the present invention, as discussed below. Furthermore, the devices and subsystems may be interconnected in different ways from that shown in FIG. 1. The operation of a computer system such as that shown in FIG. 1 is readily known in the art and is not discussed in detail in this application, so as not to overcomplicate the present discussion. Code to implement the present invention may be operably disposed in system memory 106 or stored on storage media such as fixed disk 120, floppy disk 124 or CD-ROM 128.

In accordance with embodiments of the present invention, the dynamically changing state of the user as evidenced by the end user's interaction with the devices, applications and the network, is collected and disseminated it to subscribing applications and/or services, based on an opt-in model. The type of presence information consumed by these applications depends on the number and precision of the attributes that the network is capable of capturing and reporting between the two ends of a potential communications session.

Presence information is aggregated and disseminated across multiple devices and multiple networks, including legacy circuit-based networks and IP packet-switched networks to enable subscription to and dissemination of this changing real-time state of a person so that presence applications can function.

Exemplary presence applications include, by way of example, a "Find Friend" application that notifies a person when a friend is nearby, an "Auto-conferencing" application that automatically calls a user when that user is available on any device. The applications also include, by way of example, an "Automatic call completion" application that detects when a user is free and asks the user to call a subscriber at that point, and a wireless advertising application that sends advertisements to a mobile phone based on the user' proximity.

Presence information may also be used to determine whether a user is available to take a call before the call is made (e.g. whether the person to be called is currently calling another person, or browsing on his or her user device. Presence information may also be used to determine whether a user is available for a meeting, such as when the presence information shows the user is at his or her office and is not currently engaged with any other tasks related to the device. Presence information may also be used to determine whether a user is available to talk at home, such as when the presence information shows the user is at his or her office and the physical location is the home location.

According to another embodiment of the present invention, location-based screening may be used to determine which calls to accept based at least in part on a physical address of the person being called.

Figure 2:
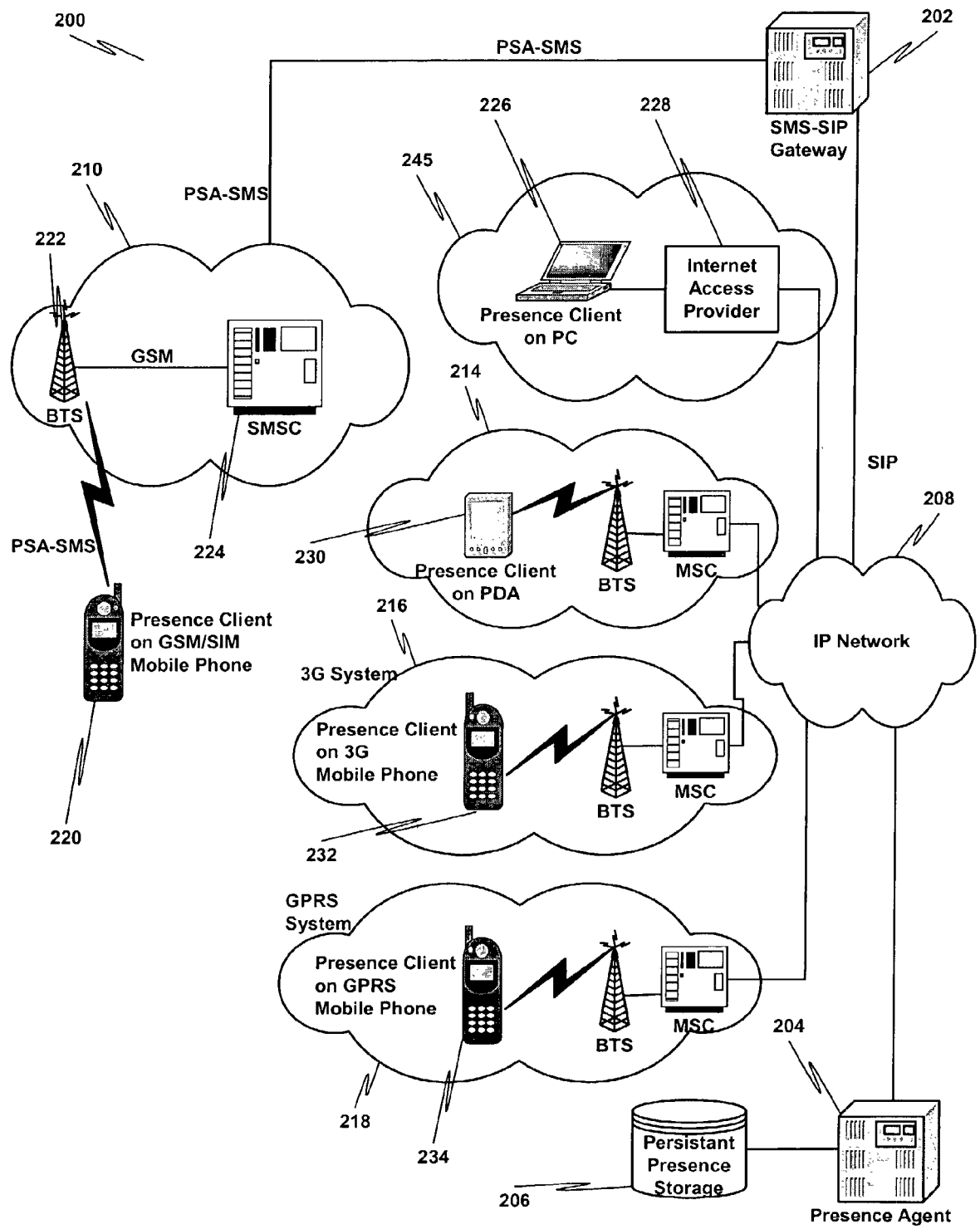
FIG. 2 is a block diagram that illustrates a system for dynamic presence information management in accordance with one embodiment of the present invention.

Turning now to FIG. 2, a block diagram that illustrates a system for dynamic presence information management in accordance with one embodiment of the present invention is presented. System 200 includes a presence agent 204 managing dynamic presence information and persistent presence storage 206 for storing persistent presence information. System 200 also includes at least one client device 220, 226, 230, 232, 234 configured to supply dynamic presence information of a user as it relates to the user's interaction with the device. Client devices 220, 226, 230, 232, 234 signal state information based at least in part on events occurring on the devices. In more detail, client devices 220, 226, 230, 232, 234 are configured to collect and report presence information to presence agent 204 and enable a user to subscribe to events that are applicable for a particular client device. Client devices 220, 226, 230, 232, 234 are also configured to receive and process one or more notification from at least one presence agent 204. Presence agent 204 receives dynamic presence information collected by client devices 220, 226, 230, 232, 234, matches the dynamic presence information with subscription information and notifies client devices 220, 226, 230, 232, 234 accordingly.

According to embodiments of the present invention, a client device comprises any device configured to render digital content to a user 305. By way of example, a client device may comprise a personal digital assistant (PDA), a personal computer (PC), a Windows CE device, a mobile phone, an EPOCH O/S-based GPRS, a server computer in communication with a user display, or the like. According to another embodiment of the present invention, a client device comprises a secure portable device such as a Java Card™ technology-enabled device, or the like. Java Card™ technology is described in Z. Chen, Java Card™ Technology for Smart Cards (2000).

According to one embodiment of the present invention, a client device comprises CDMA technology-enabled smart card. CDMA technology-enabled smart cards are described in CDMA Development Group Document #43, entitled "Smart Card Stage I Description", Version 1.1, May 22, 1996, available on the World Wide Web at cdg.org.

According to another embodiment of the present invention, a client device comprises a SIM (Subscriber Identity Module card) card. The term "SIM card" describes the smart card used in GSM (Global System for Mobile Communications) mobile telephones. The SIM includes the subscriber's personal cryptographic identity key and other information such as the current location of the phone and an address book of frequently called numbers. The SIM is described in GSM 11.11—Digital cellular telecommunications system (Phase 2+); Specification of the Subscriber Identity Module-Mobile Equipment (SIIM-ME) interface (GSM 11.11)", available on the World Wide Web at etsi.org.

According to another embodiment of the present invention, a client device comprises a WIM (Wireless Interface Module). A WIM is a smart card in a WAP (Wireless Application Protocol) phone. It is described in "Wireless Identity Module Specification, available on the World Wide Web at wapforum.org.

According to another embodiment of the present invention, a client device comprises a USIM (Universal Subscriber Identity Module). A USIM is a smart card for a 3GPP ($3^{rd}$ Generation Partnership Project) mobile phone. It is described in 3G TS 21.111 Version 4.0.0, USIM and IC Card Requirements, available on the World Wide Web at 3gpp.org.

According to another embodiment of the present invention, a client device comprises a UIM (User Identity Module). A UIM is a smart card for a 3GPP Project 2 (3GPP2) mobile phone. The term "R-UIM" is used when the smart card is removable. A UIM is a super set of SIM and allows CDMA (Code Division Multiple Access)-based cellular subscribers to roam across geographic and device boundaries. The R-UIM is described in a specification issued by the 3rd Generation Partnership Project 2 (3GPP2) and entitled "Removable User Identity Module (R-UIM) for cdma2000 Spread Spectrum Systems (3GPP2 C.S0023-0)", Jun. 9, 2000, available on the World Wide Web at 3gpp2.org.

The above description regarding various mobile phone technologies is not intended to be limiting in any way. Those of ordinary skill in the art will recognize that other client devices may be used.

As shown in FIG. 2, device 220 comprises a GSM mobile phone configured with a SIM card. The SIM card includes code for communicating with the mobile phone to obtain dynamic presence information and communicating with presence agent 204 to provide dynamic presence information, and to receive dynamic presence information relating to users subscribed to. The SIM card also communicates with SMS-SIP gateway 202 which converts SIP-like messages received from client 220 to SIP messages for transport over IP network 208 to presence agent 204. The SIP-like protocol is described in more detail below with reference to FIG. 3.

Figure 3:
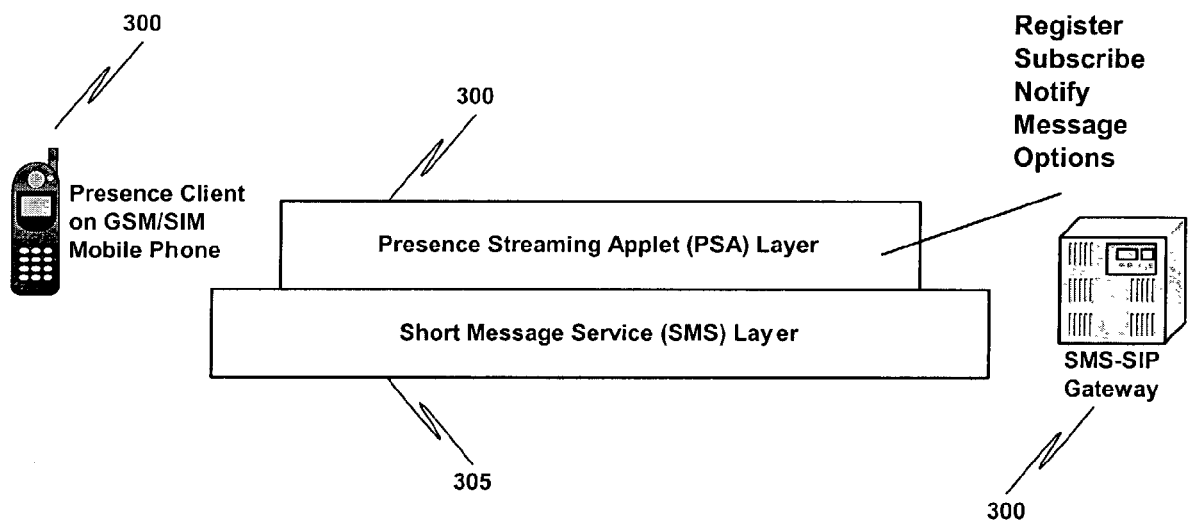
FIG. 3 is a block diagram that illustrates using Short Message Service (SMS) as a bearer protocol to transport presence information in accordance with one embodiment of the present invention.

Turning now to FIG. 3, a block diagram that illustrates using Short Message Service (SMS) as a bearer protocol to transport presence information in accordance with one embodiment of the present invention is presented. SMS 305 is used as a transport mechanism to transport dynamic presence information in a presence streaming applet (PSA) layer 300 using a SIP-like protocol.

The SMS message comprises a series of TLVs (Tag-length-value). The last SMS message is user-defined. According to one embodiment of the present invention, this user-defined field is used for SIP-like messages disclosed herein. In other words, SIP-like messages are embedded within SMS messages.

The Short Message Service (SMS), as defined within the GSM digital mobile phone standard specifies that both text and non-text based short messages (for example, in binary format) are supported. According to one embodiment of the present invention, presence information is transported in binary format.

The SMS comprises seven elements particular to the submission and reception of messages:

Validity-Period;

Service-Center-Time-Stamp

Protocol-Identifier;

More-Messages-to-Send;

Priority;

Messages-Waiting;

Alert-SC

The "Protocol-Identifier" is the information element by used to refer to a higher layer protocol being used, or indicates internetworking with a certain type of telematic device. According to one embodiment of the present invention, the "Protocol-Identifier" field is used to indicate the SMS message contents include presence information formatted according to the SIP-like protocol described herein.

According to embodiments of the present invention, the presence or application layer messages submitted to the PSA have a namespace that is a combination of the IMSI (International Mobile Subscriber Identifier as the contact and the SIP address of the ME as the namespace using the Internet electronic email-option of the SMS packet TP-PID.

MT SMS:

[<from-address><space>]<message>

MO SMS:

[<to-address><space>]<message>

The SIP-SMS gateway performs the addressing and namespace resolution to IP addresses as described in copending, U.S. patent application Ser. No. 10/183,031, filed Jun. 25, 2002, "Transcoding SMS-Based Streamed Messages To SIP-Based IP Signals In Wireless And Wireline Networks".

According to embodiments of the present invention, SIP-like request that exceed the 160-character limitation of SMS are fragmented and sent using multiple SMS messages. The fragmented messages are then reassembled at the end stations (both the SIM presence applet and the SMS-SIP gateway).

According to another embodiment of the present invention, SMS messages are reassembled at the end stations in sequence since SMS messages may be received in an order different than the order in which the SMS messages were sent.

The Session Initiation Protocol (SIP) is an application-layer control (signaling) protocol for creating, modifying and terminating sessions with one or more participants. These sessions include Internet multimedia conferences, distance learning, Internet telephony and similar applications. SIP is designed to be independent of the lower-layer transport protocol. The Session Initiation Protocol is specified in IETF Request for Comments (RFC) 2543.

SIP is a request-response protocol, dealing with requests from clients and responses from servers. Participants are identified by SIP URLs. SIP determines the end system to be used for the session, the communication media and media parameters, and the called party's desire to engage in the communication. Once these are assured, SIP establishes call parameters at either end of the communication, and handles call transfer and termination.

According to embodiments of the present invention, the SIP-like protocol comprises the following methods: "Options", "Register", "Subscribe", "Notify".

The "Options" method is used to query the media capabilities of a device.

The "Register" method is used to provide dynamic presence information from a client device to a presence agent (reference numeral 204 of FIG. 2). A user must first enroll with a presence server to establish an account with the presence system. Enrolled users are given a username, password and a SIP address (e.g. sip:<username>@<home-domain>.com"). The "Register" method may be used to register for contact and optionally attach a contact with a device. The "Register" method may also be used to update presence information. The "Register" method may also be used to register for updating a principal and device availability. The "Register" command may also be used for updating a principal and device capability.

The "Subscribe" is used to enable a principal to subscribe to an event and be notified when the event status changes.

The "Notify" method is used to inform the subscriber about the new state of an event that has been subscribed to.

The "Message" method is used to send an instant message to a principal.

In accordance with embodiments of the present invention, the term "presence" is further defined in terms of presence attributes. Presence attributes have a name attribute that defines a communication state (e.g. on-line, availability, geographic location, etc.). A presence attribute has a value (e.g. "Yes" or "No" for online-availability). A presence attribute may also be associated with a "last-updated" attribute to specify the time the value was last updated. Exemplary presence attributes and corresponding values are shown in Table 1, below.

TABLE 1

| Name | Value |
|---|---|
| register_state_principal | Yes (one or more device registered) |
| | No (not registered) |
| register_state_device | Yes (Device registered) |
| | No (device not registered) |
| my_profile | (a pointer to the user profile table) |
| status | free | busy | engaged | do not disturb | stepped out | out | vacation | business trip |
| engaged | on the phone | browsing | on IM |
| preference_contact | (the contact information corresponding to the highest q-value in the contact list) |
| contact_list | (comma-delimited contact list) |
| preference_representation_system | visual | auditory | kinesthetic |
| preference_voice_type | male | female | child |
| preference_language | (language name) |
| supported_media | (comma-delimited list of mime tokens) |
| supported_language | (comma-delimited language names) |
| location_physical | : home | office | library | café | school | laboratory |
| location_dynamic | (location determined by the dynamic location device, e.g. GPS, Cell-ID |
| location_GPS | (the original data returned by the GPS device |
| location_cell_id | (the original data returned by the radio system) |
| acceptance_phone | take call | on another call | call me back in x minutes | reject | voice mail |
| acceptance_email | active | no access | will not read (access control related) |

The presence attributes listed in Table 1 are for purposes of illustration and are not indented to be limiting in any way. Those of ordinary skill in the art will recognize that other presence attributes and attribute values are possible.

In the context of the present invention, the term "trigger" is defined as a change in the state of a presence attribute.

In the context of the present invention, the term "event" describes the result of evaluating a set of rules based at least in part on one or more trigger.

An exemplary protocol for exchange of dynamic presence information is presented below with respect to tables 2-16. The term "Outgoing" indicates a GSM/SIM device is sending a message to a SIP-SMS gateway, and the term "Incoming" indicates a GSM/SIM device will be receiving the message from the SIP-SMS gateway.

TABLE 2

| Field Name | Bytes | Value Range | Description |
|---|---|---|---|
| Presence Tag (T) | 1 | 0xAA-0xEF | Version number + tag that can identify the SIP-Like message |
| Message length (L) | 1 | 0-138 | User-defined message length |
| Method | 1 | 0x01-0x1F, | SIP-like request messages: 0x01-0x1F |
| | | 0x81-0x9F | SIP-like response messages: 0x81-0x9F |
| Header Length (Hlen) | 1 | 0x00-0x3F (0-63) | Each SIP header length |
| Header Body | Hlen | Alpha-numeric (0-9, a-z, A-Z) | SIP Header field value |
| Message Length (Mlen) | 1 | 0x00-A0 | Message body length |
| Message Body | Mlen | Alpha numeric (0-9, a-z, A-Z) | Message body |

The "Register" Method

Outgoing

TABLE 3

| Field Name | Description |
|---|---|
| Method | The "Register" request |
| Header Length | No header in "Register" request |
| Message Length (Mlen) | Message length |
| Message Body | Presence attribute that needs to be updated |

Incoming

TABLE 4

| Field Name | Description |
|---|---|
| Method | The "Register" response |
| Header length | Response code header in "Register" response |
| Response Code | Message response code |
| Message Length (Mlen) | Message length |
| Message Body | Message body that goes to the client |

The "Subscribe" Method

Outgoing

TABLE 5

| Field Name | Description |
|---|---|
| Method | The "Subscribe" method |
| Header Length (Hlen) | Length of the header |
| Header Body | Address of the principal to subscribe to (e.g. principal@domain.com) |
| Message Length (Mlen) | The message length |
| Message Body | Event ID |

Incoming

TABLE 6

| Field Name | Description |
|---|---|
| Method | The "Subscribe" response |
| Header length | Response code header in "Subscribe" response |
| Response Code | Message response code |
| Header Length (Hlen) | Length of the header |
| Header Body | Address of the principal to subscribe to (e.g. principal@domain.com) |

The "Notify" Method

Incoming

TABLE 7

| Field Name | Description |
|---|---|
| Method | The "Notify" method |
| Header length | Length of the header |
| Header body | Event ID |
| Message Length (Mlen) | Message length |
| Message Body | Notification body |

Outgoing

TABLE 8

| Field Name | Description |
|---|---|
| Method | The "Notify" response |
| Header length | Response code header in "Notify" response |
| Response Code | Message response code |

The "Message" Method

Outgoing

TABLE 9

| Field Name | Description |
|---|---|
| Method | The "Message" method |
| Header Length (Hlen) | Length of the header |
| Header Body | Receiver address (e.g. principal@domain.com) |
| Message Length (Mlen) | Message length |
| Message Body | Instant message |

Incoming

TABLE 10

| Field Name | Description |
|---|---|
| Method | This is the "Message" method |
| Header Length (Hlen) | Length of the header |
| Header Body | Sender address (e.g. principal@domain.com) |
| Message Length (Mlen) | Message length |
| Message Body | Instant message. |

Incoming/Outgoing

TABLE 11

| Field Name | Description |
|---|---|
| Method | The "Message" response |
| Header length | Response code header length in "Message" response |
| Response Code | Message response |
| Header Length (Hlen) | Length of the header |
| Header Body | Address of the principal for which instant message (e.g. principal@domain.com) was sent |

The "Options" Method

Incoming

TABLE 12

| Field Name | Description |
|---|---|
| Method | This is the "Options" method |
| Header Length (Hlen) | No header |
| Message Length (Mlen) | The message length |
| Message Body | This will be used to query the capabilities |

Outgoing

TABLE 13

| Field Name | Description |
|---|---|
| Method | The "Options" response |
| Header length | Response code header length in "Options" response |
| Response Code | Message response |
| Message Length (Mlen) | Length of the header |
| Message Body | The device capability |

Message Body

According to embodiments of the present invention, the message body may comprise presence attributes, device capabilities or a simple text message used for instant messaging. An exemplary mapping for presence attributes is shown in Table 14, below.

Presence Attributes

The presence attributes are sent in the "Register" message. An exemplary mapping for presence attributes and values is illustrated in Table 14 below.

TABLE 14

| Attribute Name | Length | Value |
|---|---|---|
| 0x01: SIP URL | 1-30 | user@domain.com |
| 0x02: DEVICE STATUS | 1 | 0 = No Information |
|  |  | 1 = Off (not applicable) |
|  |  | 2 = Idle |
|  |  | 3 = In Sleep Mode |
|  |  | 4 = Active |
|  |  | 5 = Engaged |
|  |  | 6 = Busy |
| 0x03: CELL ID | 9- | N-999-999-999-999 |
| 0x04: USER LOCATION | 1 | 0 = No Information |
|  |  | 1 = Home |
|  |  | 2 = Office |
|  |  | 3 = Lab |
|  |  | 4 = Conference Room |
|  |  | 5 = Car |
| 0x05: DEVICE LOCATION | 1 | 0 = No Information |
|  |  | 1 = Home |
|  |  | 2 = Office |
|  |  | 3 = Lab |

TABLE 14-continued

| Attribute Name | Length | Value |
|---|---|---|
| | | 4 = Conference Room |
| | | 5 = Car |
| 0x06: USER AVAILABILITY | 1 | 0 = No Information |
| | | 1 = Available |
| | | 2 = Invisible |
| | | 3 = Do Not Disturb |
| | | 4 = Voice Only |
| | | 5 = Text Only |
| | | 6 = In a Meeting |
| | | 7 = On Vacation |
| | | 8 = Business Trip |
| | | 9 = Out to Lunch |
| | | 10 = Step Out |
| | | 11 = Be Right Back |
| 0x07: DEVICE AVAILABILITY | 1 | 0 = No Information |
| | | 1 = Available |
| | | 2 = Invisible |
| | | 3 = Do Not Disturb |
| | | 4 = Voice Only |
| | | 5 = Text Only |
| 0x08: Add a mobile buddy | 1-30 | user@domain.com |
| 0x09: Delete a mobile buddy | 1-30 | user@domain.com |
| 0x0A: Delete all mobile buddies | 0 | |

Exemplary presence events are shown in Table 15, below.

TABLE 15

| Event ID | Description |
|---|---|
| 0x01 | Mobile Buddy List |
| 0x02 | Location |
| 0x03 | Availability |
| 0x04 | Preferred Contact |
| 0x05 | Phone Acceptance |
| 0x06 | Email Acceptance |
| 0x07 | IM Acceptance |

Exemplary mappings for the "buddy list" event are shown in Table 16, below.

TABLE 16

| Tag | Value |
|---|---|
| 0x01: Buddy Name | Alphanumeric |
| 0x02: device | 1 = Mobile Phone |
| | 2 = PC |
| | 3 = PDA |
| | 4 = Pager |
| | 5 = Set Top Box |
| 0x03: status | 1 = Idle |
| | 2 = In Sleep Mode |
| | 3 = Active |
| | 4 = Engaged |
| | 5 = Busy |
| 0x04: location | 0 = No Information |
| | 1 = Home |
| | 2 = Office |
| | 3 = Lab |
| | 4 = Conference Room |
| | 5 = Car |
| 0x05: phone | Phone number |
| 0x06: IM | IM client SIP URL |

Figure 4:
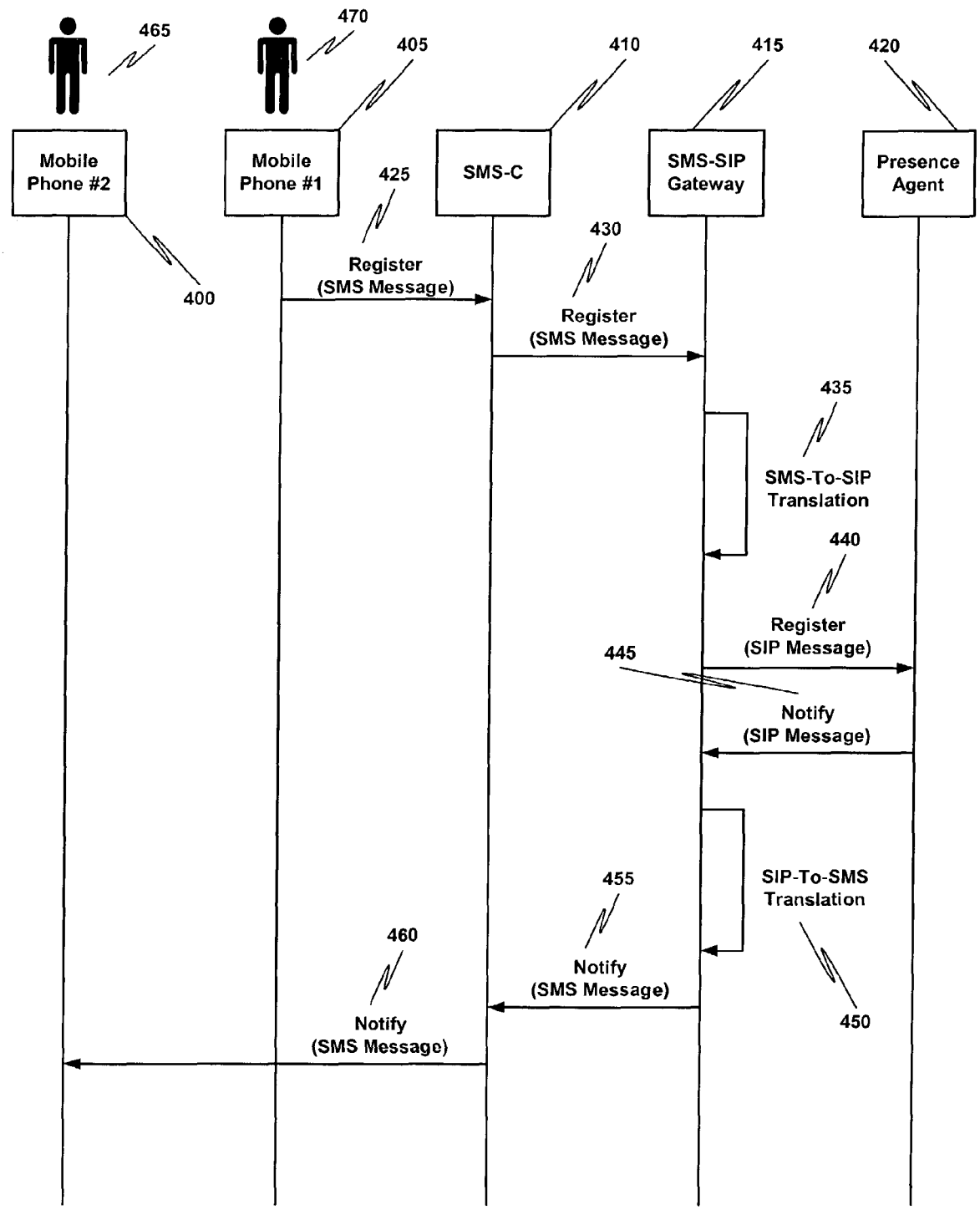
FIG. 4 is a high level event sequence diagram that illustrates collecting and using dynamic presence information in accordance with one embodiment of the present invention.

Turning now to FIG. 4, a high-level event sequence diagram that illustrates collecting and using dynamic presence information in accordance with one embodiment of the present invention is presented. In FIG. 4, user 465 associated with mobile phone 400 has previously subscribed to user 470 associated with mobile phone 405. At 425, mobile phone creates an SMS message including an embedded SIP-like "Register" message that includes dynamic presence information and sends it to SMS center 410. At 430, SMS center 410 forwards the request to SMS-SIP gateway 415. At 435, SMS gateway performs an SMS SIP-like-to-SIP translation. At 440, SMS-SIP gateway 415 sends the SIP message to presence agent 420. Presence agent 420 matches the presence information provided in the "Register" message with information for other users that subscribe to the presence of user 470. As shown in FIG. 4, user 465 subscribes to the presence of user 470. Thus, at 445, presence agent 420 issues a SIP "Notify" message to inform user 465 of user 470 presence information. SMS-SIP gateway 415 receives the SIP message. At 450, SMS-SIP gateway 415 translates the SIP message to a SIP-like message and embeds it in an SMS message. At 455, the SMS-SIP gateway sends the SMS message to SMS controller 410. At 460, SMS controller 410 forwards the SMS message to mobile phone 400 for use in informing user 465 regarding the presence information of user 470.

Figure 5:
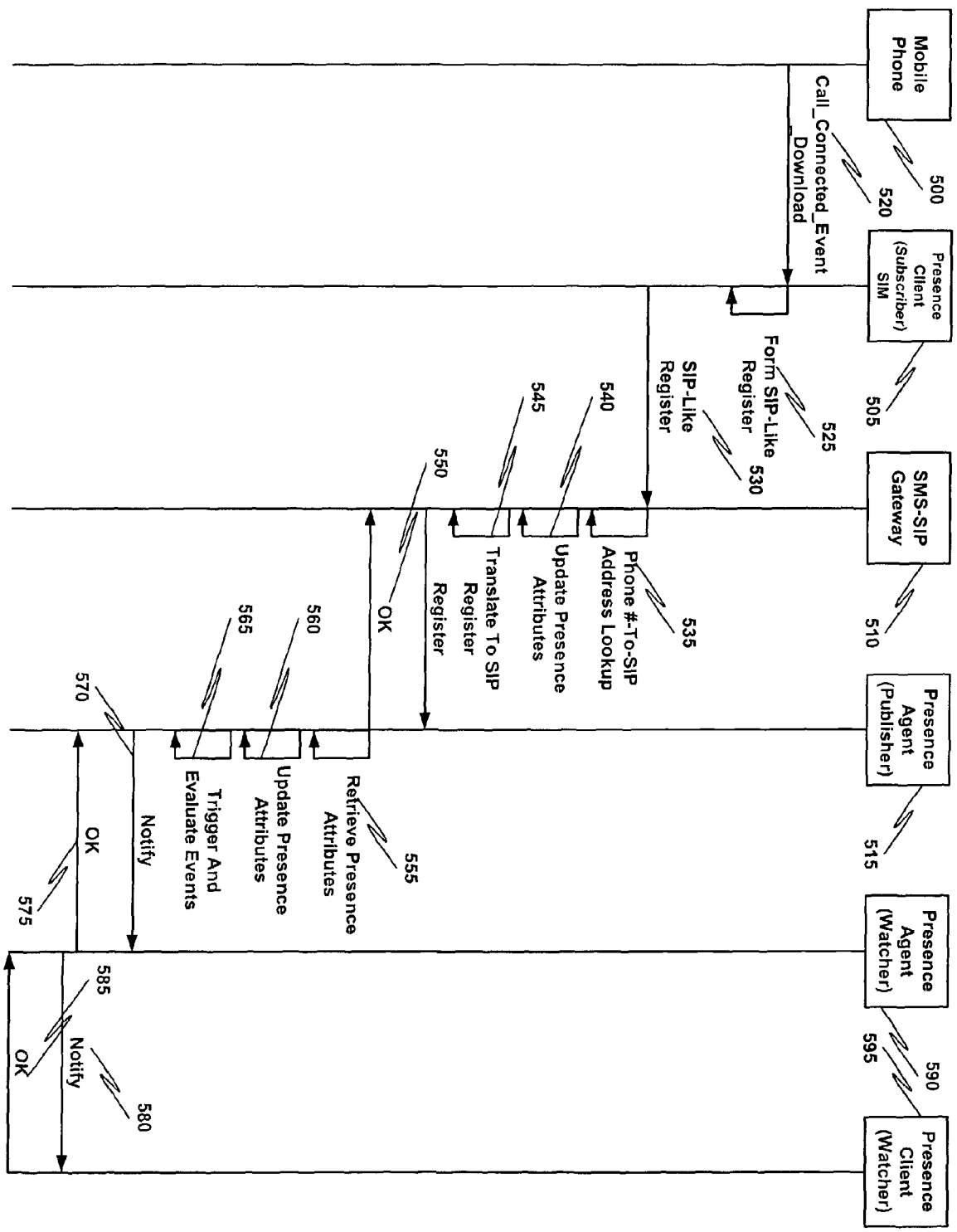
FIG. 5 is a detailed event sequence diagram that illustrates collecting and using dynamic presence information in accordance with one embodiment of the present invention.

Turning now to FIG. 5, a detailed event sequence diagram that illustrates collecting and using dynamic presence information in accordance with one embodiment of the present invention is presented. FIG. 5 provides more detail for FIG. 4. Mobile phone and 470 of FIG. 4 corresponds with mobile phone 500 of FIG. 5. Presence client SIM 505 of mobile phone 500 has previously registered for notification upon call connections on mobile phone 500. At 520, mobile phone 500 communicates the call connection event to presence client subscriber SIM 2005. At 525, presence client subscriber SIM 505 forms a SIP-like "Register" request. At 530, presence client 505 uses SMS to send the "Register" request to SMS-SIP gateway 510. At 535, SMS-SIP gateway 510 performs a phone number-to-SIP address lookup. At 540, the SMS-SIP gateway updates the presence attributes. At 545, the SMS-SIP gateway translates the SIP-like "Register" request to a SIP request. At 550, the SMS-SIP gateway sends the SIP "Register" request to presence agent 515. At 555, presence agent 515 retrieves the presence attributes associated with the originator of the "Register" request. At 560, presence agent 515 updates the presence attributes with information from the "Register" request. At 565, an event may be triggered based on the update. These updates are evaluated. If the result of the evaluation indicates notification is required, at 570, presence agent 590 is notified. Presence agent 590 responds with a "success status" at 575. At 580, presence agent 590 sends a "Notify" message to presence client 595. Presence client 595 responds with a success status at 585.

Figure 6:
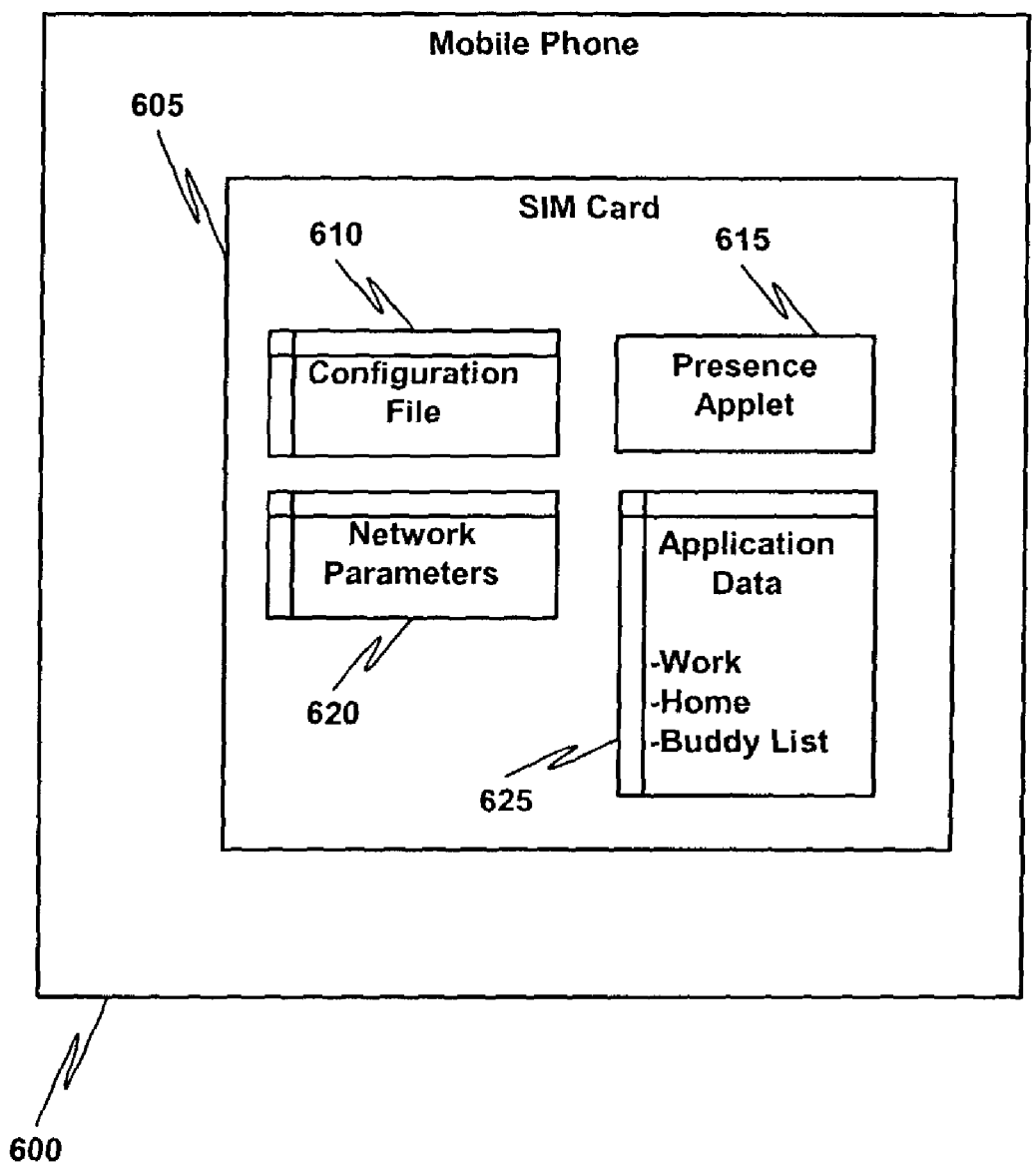
FIG. 6 is a block diagram that illustrates a mobile phone equipped with a SIM (Subscriber Identity Module) card configured to collect and distribute dynamic presence information in accordance with one embodiment of the present invention.

Turning now to FIG. 6, a block diagram that illustrates a mobile phone equipped with a SIM card configured to collect and distribute dynamic presence information in accordance with one embodiment of the present invention is presented. Mobile phone 600 comprises a SIM card 605. SIM card 605 comprises a configuration file 610, network parameters 620, application data 625 and a presence applet 615. Presence applet is configured to collect presence information from mobile phone 600 and to provide presence information. Application data may comprise, by way of example, a work address, a home address and a "buddy list".

Turning now to FIG. 7A, a block diagram that illustrates a buddy list in accordance with one embodiment of the present invention is presented. Buddy list 700 comprises one or more names of individuals for whom presence is subscribed, the status, phone contacts and SMS contacts.

Turning now to FIG. 7B, a block diagram that illustrates a configuration file in accordance with one embodiment of the present invention is presented. Configuration file 720 may include a username, password, a default "Register" duration time, a device ID generated by a presence agent when the device is registered for the first time, and one or more contact URLs attached to the device.

Figure 8:
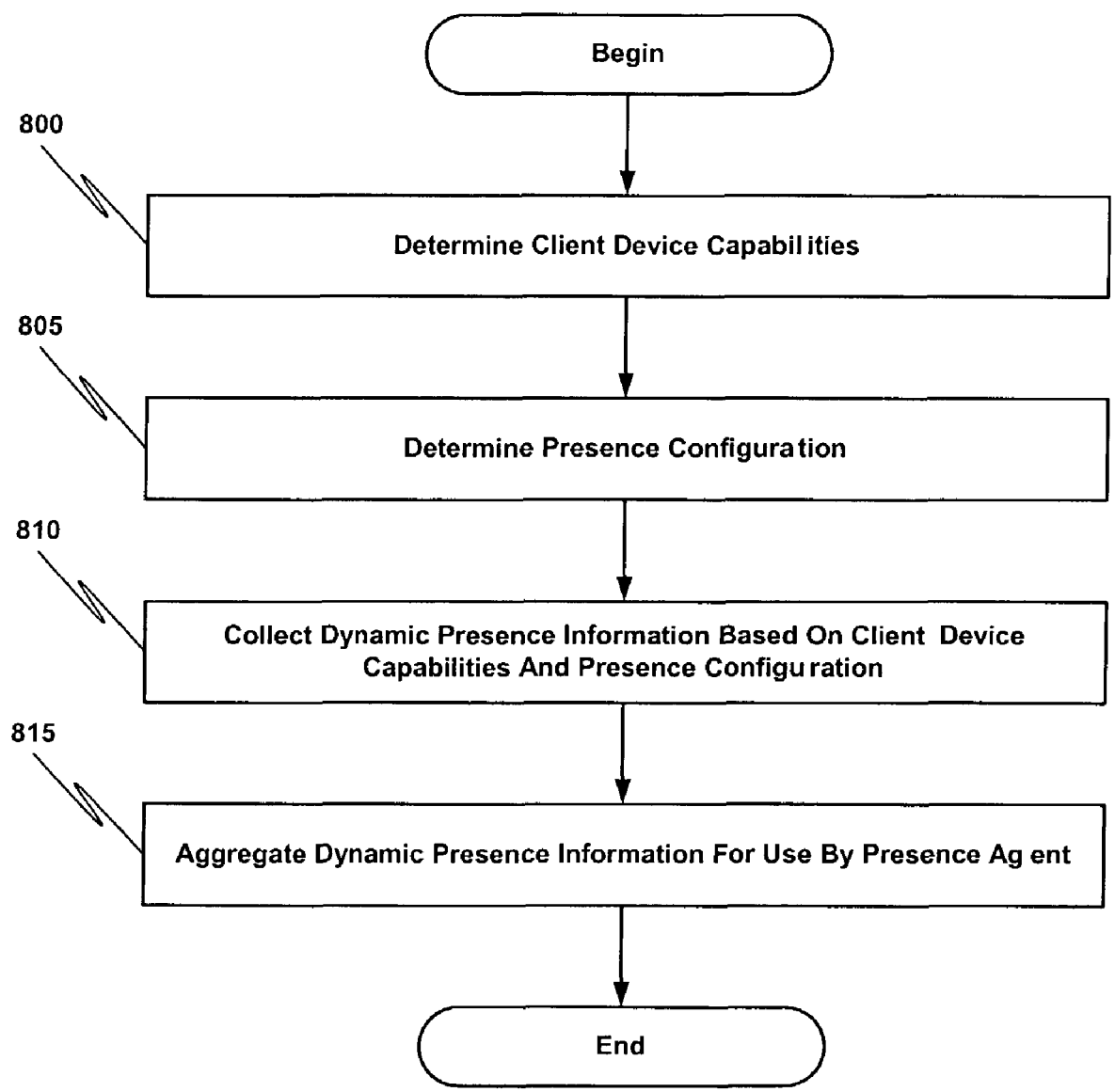
FIG. 8 is a flow diagram that illustrates a method for collecting and distributing presence information in accordance with one embodiment of the present invention.

Turning now to FIG. 8, a flow diagram that illustrates a method for collecting and distributing presence information in accordance with one embodiment of the present invention is presented. At 800, client device capabilities are determined. At 805, a presence configuration is determined. The presence configuration may comprise information regarding events that are subscribed to and actions to perform upon notification of the event's occurrence. The presence configuration may also include an indication of the presence information that is to be collected and provided to a presence agent. At 810, dynamic presence information is collected based at least in part on the mobile phone capabilities and dynamic presence configuration information.

Figure 9:
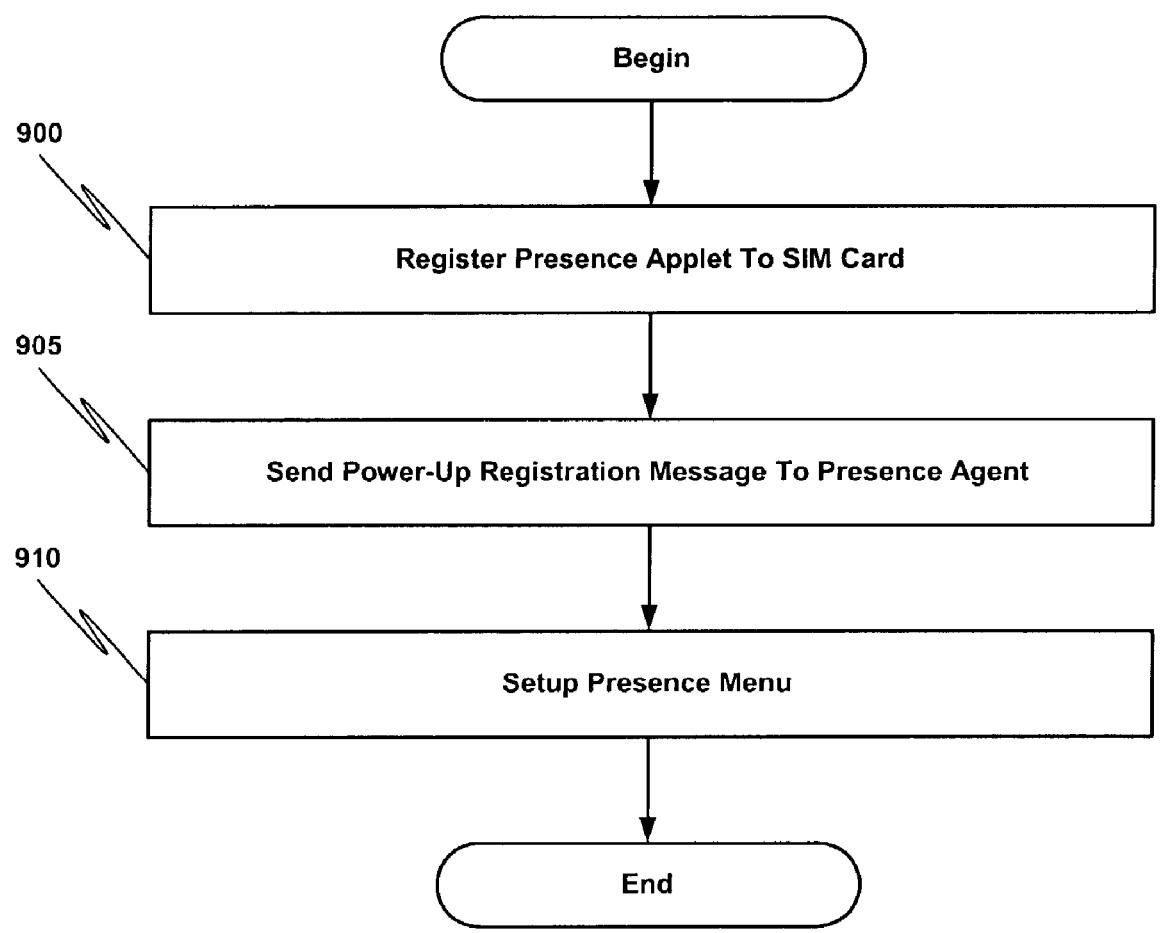
FIG. 9 is a flow diagram that illustrates a method for initializing a SIM card in accordance with one embodiment of the present invention.

Turning now to FIG. 9, a flow diagram that illustrates a method for initializing a SIM card in accordance with one embodiment of the present invention is presented. At 900, the presence applet is registered to the SIM card. At 905, a "Power-up" registration message is sent to a presence agent. At 910, the presence menu is setup. This is explained in more detail with reference to FIG. 10.

Figure 10:
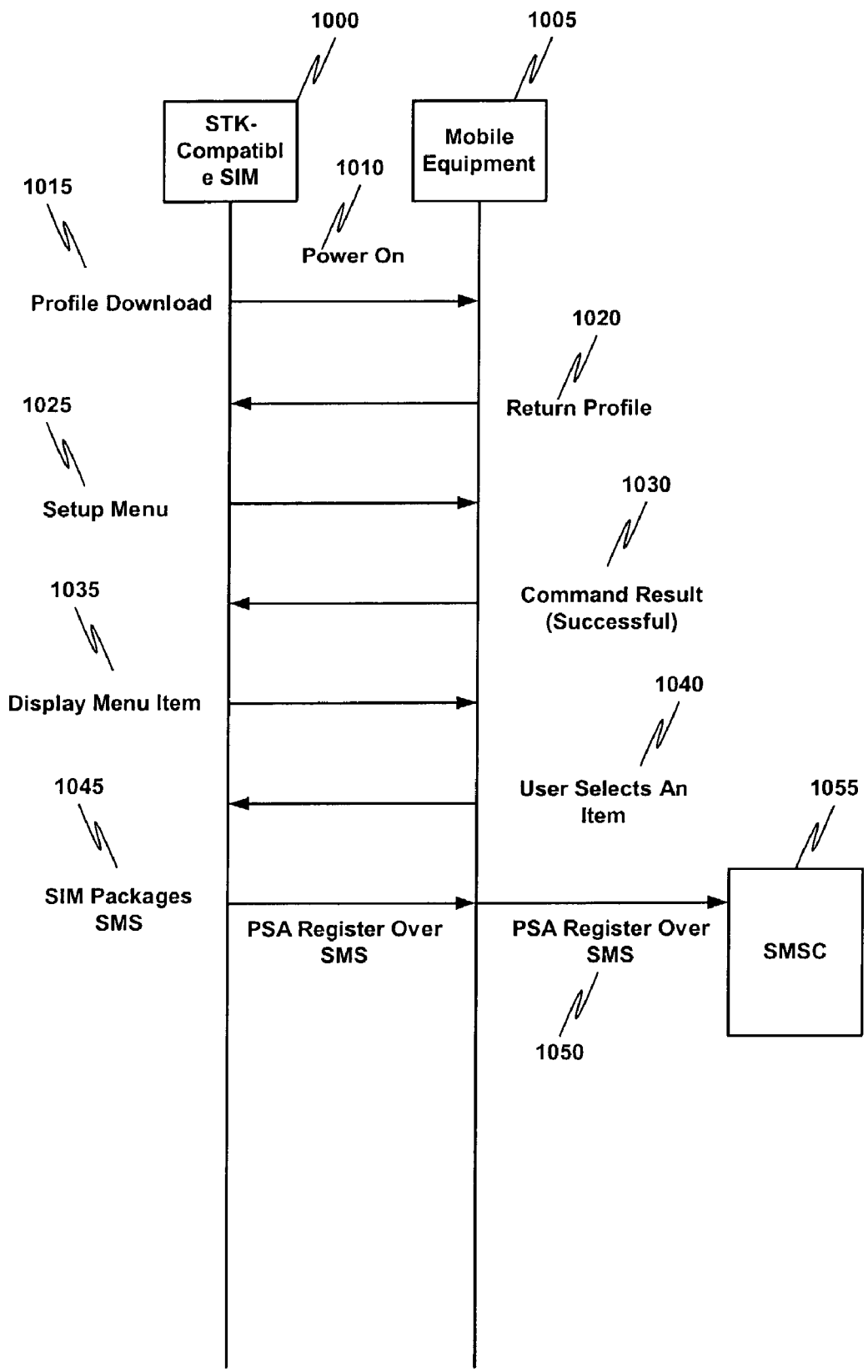
FIG. 10 is an event sequence diagram that illustrates initialization of a SIM card in accordance with one embodiment of the present invention.

Turning now to FIG. 10, an event sequence diagram that illustrates initialization of a SIM card in accordance with one embodiment of the present invention is presented. At 1010, the mobile phone is turned on. At 1015, the SIM card requests the mobile phone's profile so that its capabilities may be determined. At 1020, the mobile phone sends the profile to the SIM card. At 1025, the SIM card uses a proactive command to request the mobile phone setup a menu. At 1030, the mobile phone responds with status. At 1035, the SIM card requests a user selection. At 1040, the mobile phone returns a user selection. At 1045, the SIM card packages sends presence information via SMS to the SMS controller 1055.

Figure 11:
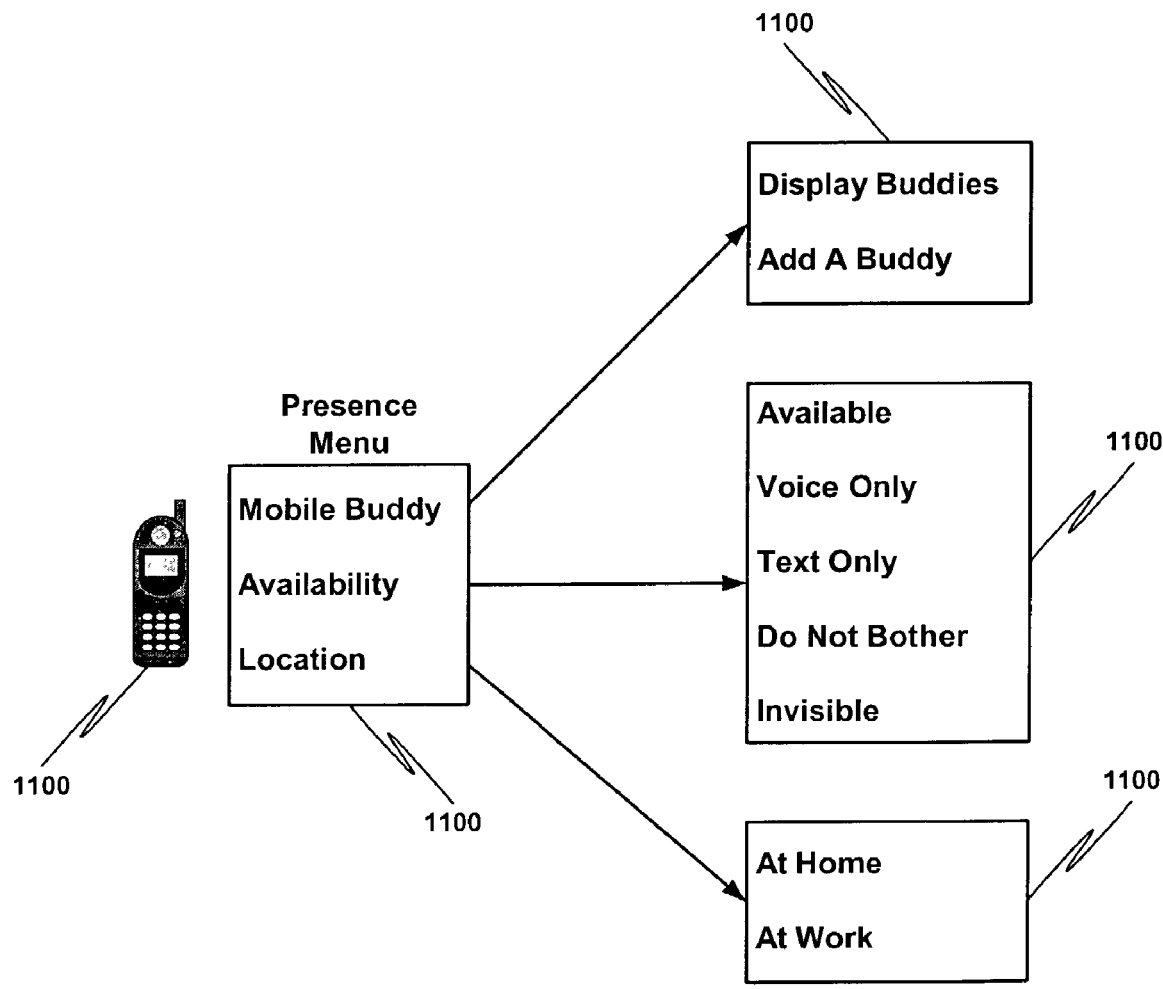
FIG. 11 is a block that illustrates a menu in accordance with one embodiment of the present invention.

Turning now to FIG. 11 a block that illustrates a menu in accordance with one embodiment of the present invention is presented. Top-level menu 1100 includes entries relating to mobile buddies, the user's availability preferences, and the user's location. Mobile buddy sub-menu 1100 includes entries for displaying mobile buddies and adding a buddy. Availability sub-menu 1100 includes entries to indicate the user is available, available for voice communications only, available for text communications only, not to be bothered and invisible. Location sub-menu includes entries to indicate the user is at home or at work.

Figure 12:
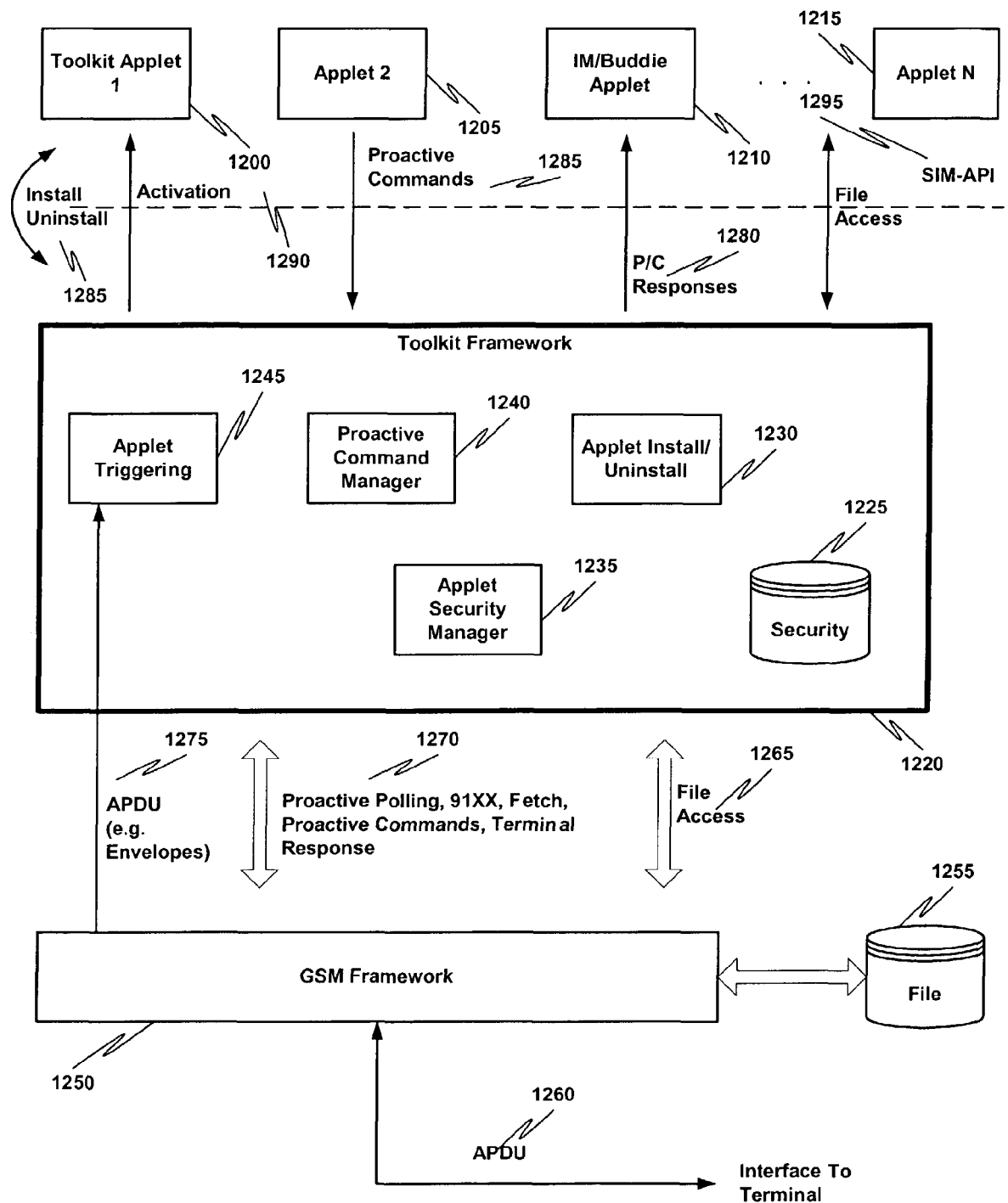
FIG. 12 is a block diagram that illustrates a SIM Application Toolkit (STK) used to create SIM software for collection and distribution of dynamic presence information in accordance with one embodiment of the present invention.

Turning now to FIG. 12, a block diagram that illustrates a SIM Application Toolkit (STK) used to create SIM software for collection and distribution of dynamic presence information in accordance with one embodiment of the present invention is presented. The SIM Application Toolkit (STK) is an ETSI (European Telecommunications Standards Institute)/ SMG (Special Mobile Group) standard (GSM 11.14) for Value Added Services and e-commerce using GSM phones to do the transactions. "Specification of the SIM Application Toolkit for the Subscriber Identity Module-Mobile Equipment (SIM-ME) Interface". The SIM Toolkit defines how the card should interact with the outside world and extends the communication protocol between the card and the handset.

The STK lets the SIM card issue commands to the telephone. These commands range from displaying menus and getting user input to sending and receiving SMS messages. The STK is designed as a client-server application, where the server is the SIM card and the client is the ME.

The STK supports profile download, which allows the Mobile Equipment to tell the SIM card what STK facilities it is capable of supporting. According to embodiments of the present invention, the SIM card limits the commands issued to the ME based at least in part on the capabilities of a ME.

The STK also supports proactive SIM, which is a mechanism through which the SIM card can inform the Mobile Equipment that it has some information or commands for the Mobile Equipment to carry out, which the Mobile Equipment can then fetch. Such actions include displaying text from the SIM card to the Mobile Equipment, sending a short message, setting up a voice or data call to a number held in the SIM card, and so on. Table 16 illustrates the commands the SIM card can issue to the Mobile Equipment using the proactive commands:

TABLE 17

| Command | Explanation |
| --- | --- |
| Display Text | Displays text (of less than 160 characters) on the screen |
| GET INKEY | Sends text to the display and requests a single character answer |
| GET INPUT | Sends text to the display and requests a response |
| MORE TIME | Requests more time to perform a task |
| PLAY TONE | Plays a tone |
| POLL INTERVAL | Tells the Mobile Equipment how often to send status data to the SIM card during idle mode |
| POLLING OFF | Stops the polling function by the mobile phone |
| REFRESH | Asks the mobile phone to re-read all data from the SIM card |
| SEND SHORT MESSAGE | Sends a short message to the mobile network |
| SEND SS | Sends a supplementary string to the mobile network |
| SEND USSD | Sends an Unstructured Supplementary Services Data (USSD) string to the mobile network |
| SET UP CALL | Initiates a voice call |
| PROVIDE LOCAL INFORMATION | Requests that Mobile Equipment passes local information to SIM such as country and mobile network codes for roamers |

The STK can also support menu selection, where the SIM provides menu items for the MMI (Man-Machine Interface) to display and registers which one was selected The STK also supports call control by the SIM. When activated, all call setup attempts will result in the telephone numbers, supplementary services and Unstructured Supplementary Services Data (USSD) strings being sent first to the SIM card. The SIM card can then decide whether to allow those actions to be carried out or can selectively bar them.

The STK also supports Event Download. This command is sent from the handset to the SIM to state that an event happened. The events to be downloaded comprise indications that a mobile call has been terminated, connected or disconnected. The events also comprise an indication of user activity (e.g. when the user presses buttons on the handset) and an indication of an idle screen (the screen is blank).

The STK also supports mobile-originated Short Message control by SIM and sending APDU commands to a second SIM card. An APDU is defined in ISO standard 7816-4.

The Application Program Interface (API) for SIM Application Toolkit is a platform that allows developers to create STK applets for the SIM. These applets can be loaded onto the SIM remotely by the provider using STK functions. The STK API on a GSM Phase 2+ SIM is based on the Java 2.1 Runtime Environment, which is depicted in FIG. 12. The SIM toolkit framework is the GSM Java Card runtime environment. It comprises the JCRE (Java Card™ Runtime Environment), the Toolkit Registry, the Toolkit Handler and the File System. The JCRE is specified in Java Card 2.1 Runtime Environment Specification and is able to select any specific applet and transmit it to the process of its APDU (Application Protocol Data Unit). The Toolkit Registry handles all the registration information of the toolkit applets, and their link to the JCRE registry. The Toolkit Handler handles the availability of the system handler and the toolkit protocol (i.e. toolkit applet suspension). The file system comprises the card issuer file system, and handles the file access control and applet file context. The applets derive from javacard.framework.applet and thus provide the same entry points, and implement the shareable interface sim.toolkit.ToolkitInterface so that these applets can be triggered by an invocation of their process-Toolkit method.

According to embodiments of the present invention, applet 1205 comprises a presence client. The presence client communicates with the mobile phone to obtain dynamic presence information and communicates with a presence agent to provide dynamic presence information, and to receive dynamic presence information relating to users subscribed to.

FIGS. 13A-15 are event sequence diagrams that illustrate using the proactive SIM feature of the SIM Application Toolkit to obtain dynamic presence information from mobile equipment (ME) such as a mobile phone configured with a SIM card in accordance with embodiments of the present invention.

Turning now to FIG. 13A, an event sequence diagram that illustrates using a proactive SIM request for dynamic presence data responsive to a normal command from a mobile phone in accordance with one embodiment of the present invention is presented. At 1304, the ME 1302 issues a normal command. At 1306, the SIM 1300 responds with a status code of '91', indicating the ME 1302 should request information from the SIM 1300. At 1308, the ME 1302 issues a "Fetch" command to the SIM 1300. At 1310, the SIM 1300 responds with a proactive SIM command that may include a request for presence information. At 1316, the ME 1302 performs the proactive SIM command. At 1312, the ME 1302 provides a successful response. At 1314, the SIM 1300 responds with a status code of '90', indicating there is nothing more for the ME 1302 to do.

Turning now to FIG. 13B, an event sequence diagram that illustrates using a proactive SIM request for dynamic presence data responsive to a status command from a mobile in accordance with one embodiment of the present invention is presented. At 1354, the ME 1352 issues a status command. At 1356, the SIM 1350 responds with normal data on dynamic presence and a status code of '91', indicating the ME 1352 should request information from the SIM 1350. At 1358, the ME 1352 issues a "Fetch" command to the SIM 1350. At 1360, the SIM 1350 responds with a proactive SIM command that may include a request for presence information. At 1366, the ME 1352 performs the proactive SIM command. At 1362, the ME 1352 provides a successful response. At 1364, the SIM 1350 responds with a status code of '90', indicating there is nothing more for the ME 1352 to do.

Turning now to FIG. 14A, an event sequence diagram that illustrates a status command from a mobile phone that is not followed by a proactive SIM request is presented. At 1404, the ME 1402 issues a status command. At 1406, the SIM 1400 responds with normal data on dynamic presence and a status code of '90', indicating there is nothing more for the ME 1402 to do.

Turning now to FIG. 14B, an event sequence diagram that illustrates repeating an unsuccessful proactive SIM request for dynamic presence data in accordance with one embodiment of the present invention is presented. FIG. 14B is similar to FIG. 13A, except that the ME 1450 responds to a proactive SIM command with an error status 1462). At this point, the SIM response with a status code of '91', which signals the ME to retry the last command. At 1466, the ME 1402 issues a "Fetch" command to the SIM 1450. At 1468, the SIM 1450 responds with the same proactive SIM command. At 1474, the ME 1452 performs the proactive SIM command. At 1470, the ME 1402 provides a successful response. At 1472, the SIM 1450 responds with a status code of '90', indicating there is nothing more for the ME 1402 to do.

Figure 15:
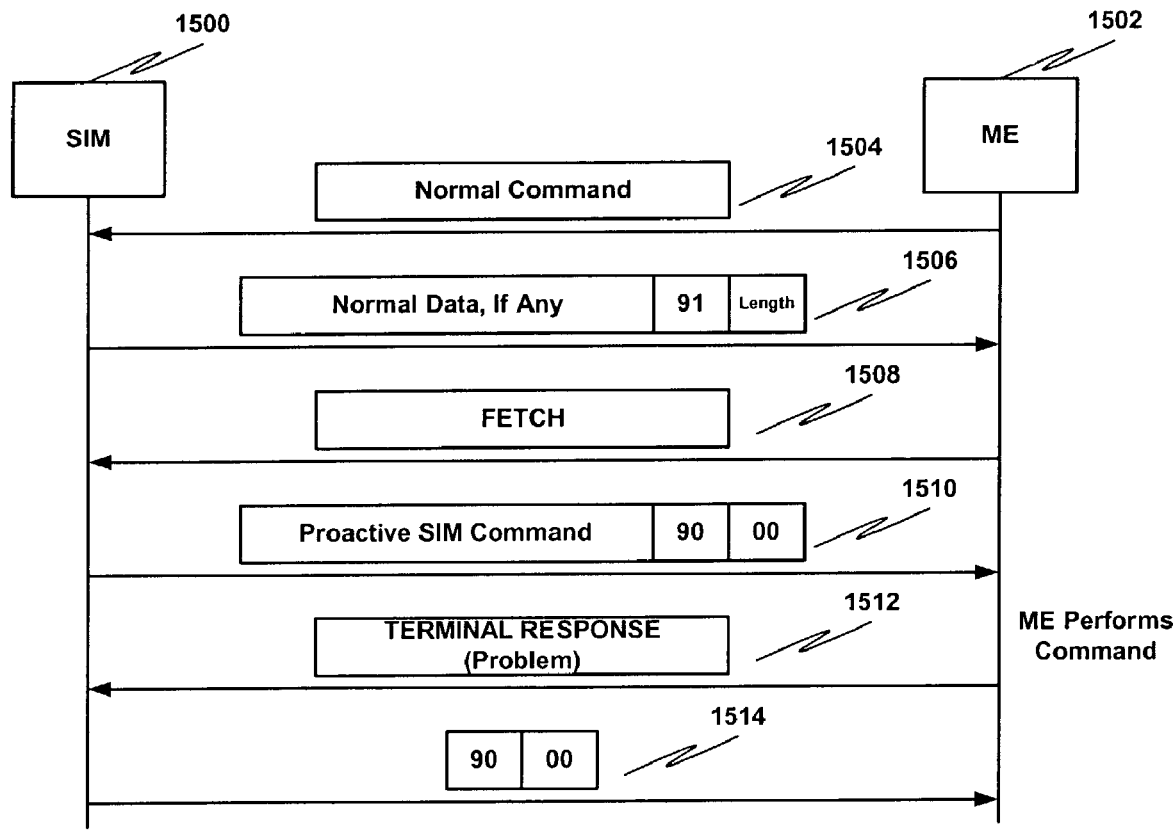
FIG. 15 is an event sequence diagram that illustrates not repeating an unsuccessful proactive SIM request for dynamic presence data in accordance with one embodiment of the present invention.

Turning now to FIG. 15, an event sequence diagram that illustrates not repeating an unsuccessful proactive SIM request for dynamic presence data in accordance with one embodiment of the present invention is presented. FIG. 15 is similar to FIG. 14B, except that a failed proactive SIM request is not repeated. Instead, in response to receiving a problem indication from the ME 1502, at 1514 the SIM 1500 returns a status code of '90', indicating there is nothing more for the ME to do.

Figure 16:
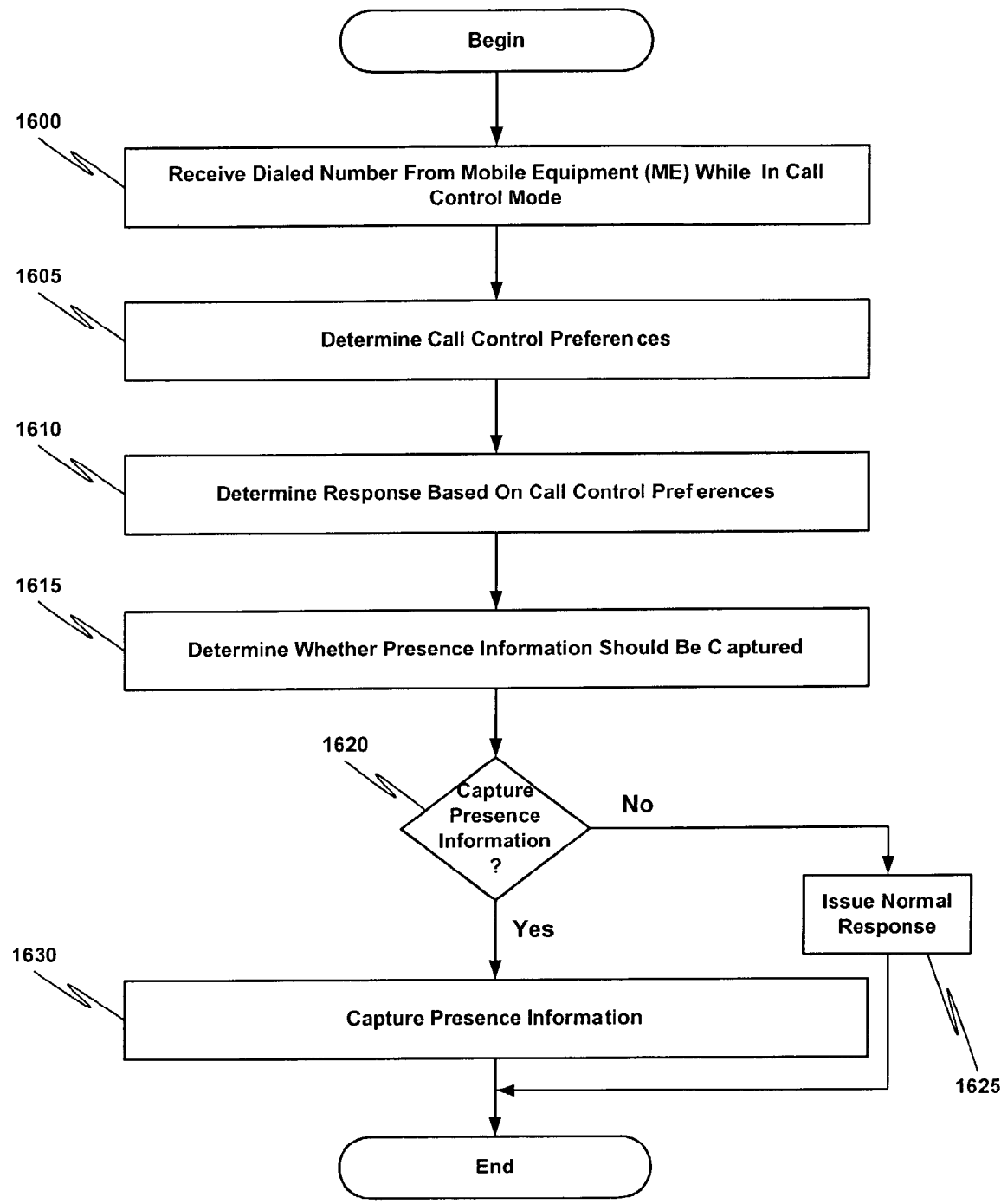
FIG. 16 is a flow diagram that illustrates a method for triggering dynamic presence information collection when a mobile phone is in "call control" mode in accordance with one embodiment of the present invention.
Figure 17:
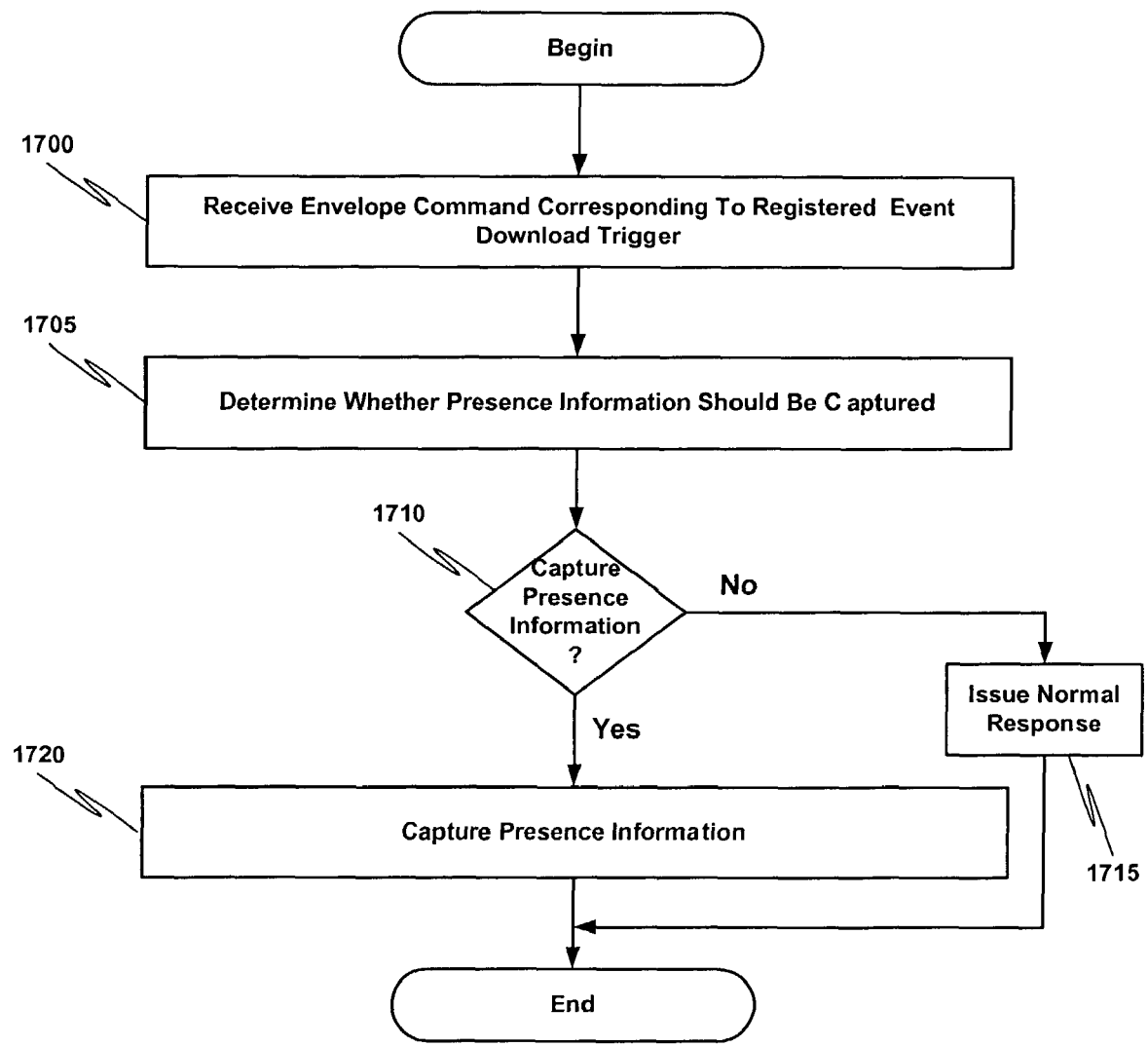
FIG. 17 is a flow diagram that illustrates an event-driven method for triggering dynamic presence information collection in accordance with one embodiment of the present invention.
Figure 18:
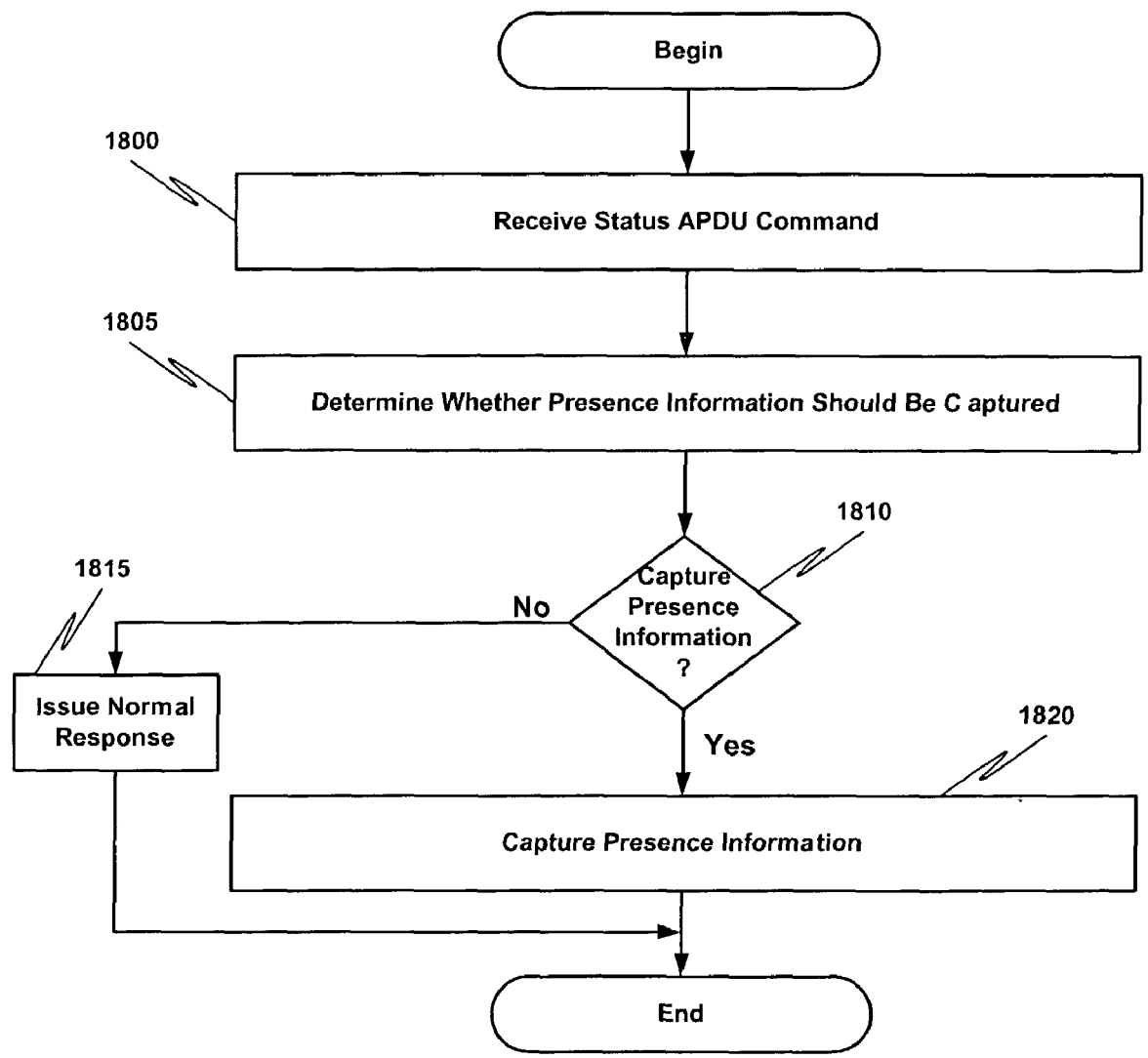
FIG. 18 is a flow diagram that illustrates a method for triggering dynamic presence information collection when a SIM card receives a status APDU (Application Protocol Data Unit) command in accordance with one embodiment of the present invention.

FIGS. 16-18 are flow diagrams that illustrate various event triggers used for triggering the capture of dynamic presence information in accordance with embodiments of the present invention. FIG. 16 illustrates triggering the capture of dynamic presence information when a user dials a number using the "call control" feature of the SIM Toolkit. FIG. 17 illustrates triggering the capture of dynamic presence information using the "event download" feature of the SIM Toolkit. FIG. 18 illustrates triggering the capture of dynamic presence information upon receipt of a "STATUS APDU" command.

Turning now to FIG. 16, a flow diagram that illustrates a method for triggering dynamic presence information collection when a mobile phone is in "call control" mode in accordance with one embodiment of the present invention is presented. At 1600, a number dialed from mobile equipment is received while in call control mode. At 1605, call control preferences are determined. The call control preferences specify whether particular numbers should be allowed. At 1610, a response is determined based at least in part on the call control preferences. At 1615, a determination is made regarding whether presence information should be captured. The determination may be based at least in part on factors such as the amount of time since the last time dynamic presence information was captured, or the like. At 1620, a flag set based on the determination 1615 is examined. If presence information should be captured, it is done at 1630. If presence information should not be captured, a normal response is issued at 1625.

Turning now to FIG. 17, a flow diagram that illustrates an event-driven method for triggering dynamic presence information collection in accordance with one embodiment of the present invention is presented. At 1700, an envelope command corresponding to a registered event download trigger is received. At 1705, a determination is made regarding whether presence information should be captured. The determination may be based at least in part on factors such as the amount of time since the last time dynamic presence information was captured, or the like. At 1710, a flag set based on the determination 1705 is examined. If presence information should be captured, it is done at 1720. If presence information should not be captured, a normal response is issued at 1715.

Turning now to FIG. 18, a flow diagram that illustrates a method for triggering dynamic presence information collection when a SIM card receives a status APDU command in accordance with one embodiment of the present invention is presented. At 1800, a status APDU command is received. At 1805, a determination is made regarding whether presence information should be captured. The determination may be based at least in part on factors such as the amount of time since the last time dynamic presence information was captured, or the like. At 1810, a flag set based on the determination 1805 is made. If presence information should be captured, it is done at 1820. If presence information should not be captured, a normal response is issued at 1815.

According to embodiments of the present invention, proactive and/or reactive congestion control mechanisms are used to protect against bottlenecks with respect to the presence information transported over SMS using the PSA layer. The congestion control mechanisms are handled by the presence user agent applet, making congestion control concerns transparent to the application layer.

Figure 19:
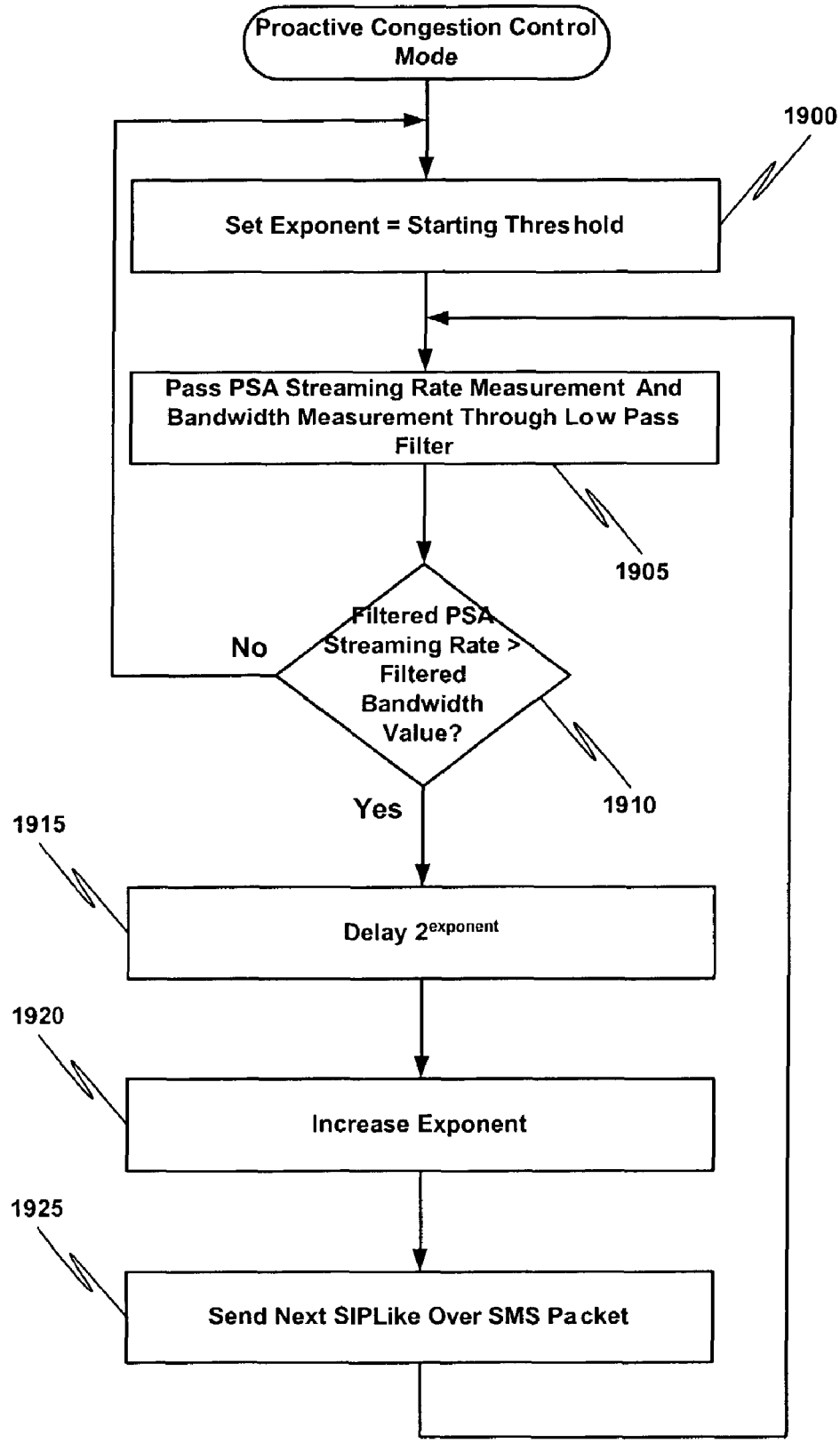
FIG. 19 is a flow diagram that illustrates a method for proactive congestion control in accordance with one embodiment of the present invention.

Turning now to FIG. 19, a flow diagram that illustrates a method for proactive congestion control in accordance with one embodiment of the present invention is presented. At 1900, an exponent is set to a starting threshold. At 1905, a measurement of the end-to-end PSA streaming rate and a current measurement of the available bandwidth are passed through a low pass filter. At 1910, a determination is made regarding whether the filtered PSA streaming rate is greater than the filtered bandwidth value. If the filtered PSA streaming rate is not greater than the filtered bandwidth value, the exponent is set to the starting threshold at 1900 and the process continues at 1905. If the filtered PSA streaming rate is greater than the filtered bandwidth value, at 1915 a delay is performed. The delay period is based on the value $2^{exponent}$. At 1920, the value of the exponent is increased. At 1925, the next SIP over SMS packet is sent. The process continues at 1905.

Figure 20:
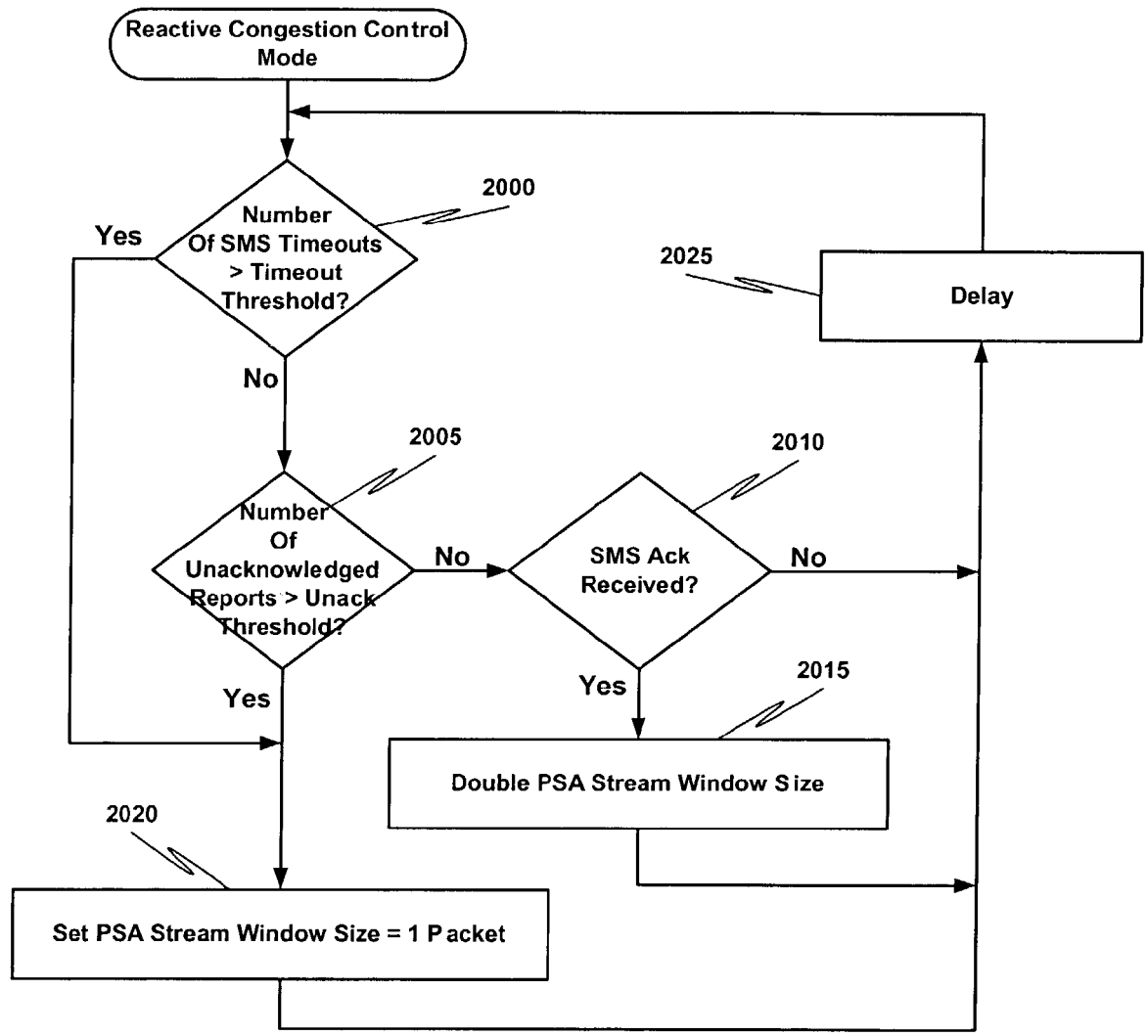
FIG. 20 is a flow diagram that illustrates a method for reactive congestion control in accordance with one embodiment of the present invention.

Turning now to FIG. 20, a flow diagram that illustrates a method for reactive congestion control in accordance with one embodiment of the present invention is presented. At 2000, a determination is made regarding whether the number of SMS timeouts is greater than a timeout threshold. At 2005 a determination is made regarding whether the number of unacknowledged reports is greater than an unack threshold. If either the timeout threshold or the unack threshold is exceeded, the PSA stream window size is set to one packet at 2020. If neither threshold is exceeded, at 2010 a determination is made regarding whether an SMS ack has been received. If an SMS ack has been received, the current PSA stream window size is doubled at 2015. The doubling of the PSA stream window size continues as long as neither the timeout threshold nor the unack threshold is exceeded.

The description of SMS as a transport mechanism for presence information is not intended to be limiting in any way. Those of ordinary skill in the art will recognize that other transport mechanisms may be used, such as USSD (Unstructured Supplementary Service Data), or the like.

Embodiments of the present invention provides aggregated presence information, increasing the probability of making a connection when call is attempted, and increasing the probability of a successful, more effective communication once connected.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for transporting dynamic presence information over a wireless and wireline communications network, the method comprising:

sending dynamic presence information related to user interaction with a client device and a presence configuration of said client device from said client device to a gateway using a SIP-like protocol, said SIP-like protocol based at least in part on the SIP protocol, said SIP-like protocol employing a transport protocol; and receiving dynamic presence information from said gateway using said SIP-like protocol, wherein said presence configuration defines information to be provided to the gateway, information of an event that is subscribed to, and one or more actions to be performed upon notification of the event occurrence, wherein said method further comprises:

passing a measurement of said SIP-like protocol streaming rate and a current bandwidth measurement through a low pass filter;

setting an exponent to a threshold value if said filtered streaming rate measurement is not greater than said filtered bandwidth value; and delaying based at least in part on the value $2^{exponent}$ and increasing said exponent if said filtered streaming rate measurement is greater than said filtered bandwidth value.

2. The method of claim 1 wherein said SIP-like protocol comprises:

an "Options" method for querying the media capabilities of a client device;

a "Register" method for providing dynamic presence information from said client device to a presence agent;

a "Subscribe" method for subscribing to an event for notification upon the occurrence of said event;

a "Notify" method for informing said subscriber about the state of an event that has been subscribed to.

3. The method of claim 2 wherein said SIP-like protocol further comprises a "Message" method for sending an instant message to a principal.

4. The method of claim 1 wherein said transport protocol comprises Short Message Service (SMS).

5. The method of claim 1 wherein said transport protocol comprises Unstructured Supplementary Services Data (USSD).

6. A method for transporting dynamic presence information over a wireless and wireline communications network, the method comprising:

sending dynamic presence information related to user interaction with a client device and a presence configuration of said client device from said client device to a gateway using a SIP-like protocol, said SIP-like protocol based at least in part on the SIP protocol, said SIP-like protocol employing a transport protocol; and receiving dynamic presence information from said gateway using said SIP-like protocol, wherein said presence configuration defines information to be provided to the gateway, information of an event that is subscribed to, and one or more actions to be performed upon notification of the event occurrence, wherein said method further comprises:

setting the window size for said SIP-like protocol stream to one packet if the number of SMS timeouts exceeds a timeout threshold, or if the number of unacknowledeged reports is greater than an "Unack" threshold; and doubling the window size of said SIP-like protocol stream if the number of SMS timeouts does not exceed said timeout threshold and if the number of unacknowledeged reports is not greater than said "Unack" threshold.

7. A program storage device readable by a machine, the program storage device embodying a program of instructions executable by the machine to perform a method of transporting dynamic presence information over a wireless and wireline communications network, the method comprising:

sending dynamic presence information related to user interaction with a client device and a presence configuration of said client device from said client device to a gateway using a SIP-like protocol, said SIP-like protocol based at least in part on the SIP protocol, said SIP-like protocol employing a transport protocol; and receiving dynamic presence information from said gateway using said SIP-like protocol, wherein said presence configuration defines information to be provided to the gateway, information of an event that is subscribed to, and one or more actions to be performed upon notification of the event occurrence, wherein said method further comprises:

passing a measurement of said SIP-like protocol streaming rate and a current bandwidth measurement through a low pass filter;

setting an exponent to a threshold value if said filtered streaming rate measurement is not greater than said filtered bandwidth value; and delaying based at least in part on the value $2^{exponent}$ and increasing said exponent if said filtered streaming rate measurement is greater than said filtered bandwidth value.

8. The program storage device of claim 7 wherein said SIP-like protocol comprises:
   an "Options" method for querying the media capabilities of a client device;
   a "Register" method for providing dynamic presence information from said client device to a presence agent;
   a "Subscribe" method for subscribing to an event for notification upon the occurrence of said event;
   a "Notify" method for informing said subscriber about the state of an event that has been subscribed to.

9. The program storage device of claim 8 wherein said SIP-like protocol further comprises a "Message" method for sending an instant message to a principal.

10. The program storage device of claim 7 wherein said transport protocol comprises Short Message Service (SMS).

11. The program storage device of claim 7 wherein said transport protocol comprises Unstructured Supplementary Services Data (USSD).

12. A program storage device readable by a machine, the program storage device embodying a program of instructions executable by the machine to perform a method of transporting dynamic presence information over a wireless and wireline communications network, the method comprising:

sending dynamic presence information related to user interaction with a client device and a presence configuration of said client device from said client device to a gateway using a SIP-like protocol, said SIP-like protocol based at least in part on the SIP protocol, said SIP-like protocol employing a transport protocol; and receiving dynamic presence information from said gateway using said SIP-like protocol, wherein said presence configuration defines information to be provided to the gateway, information of an event that is subscribed to, and one or more actions to be performed upon notification of the event occurrence, wherein said method further comprises:

setting the window size for said SIP-like protocol stream to one packet if the number of SMS timeouts exceeds a timeout threshold, or if the number of unacknowledeged reports is greater than an "Unack" threshold; and doubling the window size of said SIP-like protocol stream if the number of SMS timeouts does not exceed said timeout threshold and if the number of unacknowledeged reports is not greater than said "Unack" threshold.

13. An apparatus for transporting dynamic presence information over a wireless and wireline communications network, the apparatus comprising:

means for sending dynamic presence information related to user interaction with a client device and a presence configuration of said client device from said client device to a gateway using a SIP-like protocol, said SIP-like protocol based at least in part on the SIP protocol, said SIP-like protocol employing a transport protocol; and means for receiving dynamic presence information from said gateway using said SIP-like protocol, wherein said presence configuration defines information to be provided to the gateway, information of an event that is subscribed to, and one or more actions to be performed upon notification of the event occurrence, wherein said apparatus further comprises:

means for passing a measurement of said SIP-like protocol streaming rate and a current bandwidth measurement through a low pass filter;

means for setting an exponent to a threshold value if said filtered streaming rate measurement is not greater than said filtered bandwidth value; and means for delaying based at least in part on the value $2^{exponent}$ increasing said exponent if said filtered streaming rate measurement is greater than said filtered bandwidth value.

14. The apparatus of claim 13 wherein said SIP-like protocol comprises:
   an "Options" method for querying the media capabilities of a client device;
   a "Register" method for providing dynamic presence information from said client device to a presence agent;
   a "Subscribe" method for subscribing to an event for notification upon the occurrence of said event;
   a "Notify" method for informing said subscriber about the state of an event that has been subscribed to.

15. The apparatus of claim 14 wherein said SIP-like protocol further comprises a "Message" method for sending an instant message to a principal.

16. The apparatus of claim 13 wherein said transport protocol comprises Short Message Service (SMS).

17. The apparatus of claim 13 wherein said transport protocol comprises Unstructured Supplementary Services Data (USSD).

18. An apparatus for transporting dynamic presence information over a wireless and wireline communications network, the apparatus comprising:

means for sending dynamic presence information related to user interaction with a client device and a presence configuration of said client device from said client device to a gateway using a SIP-like protocol, said SIP-like protocol based at least in part on the SIP protocol, said SIP-like protocol employing a transport protocol; and means for receiving dynamic presence information from said gateway using said SIP-like protocol, wherein said presence configuration defines information to be provided to the gateway, information of an event that is subscribed to, and one or more actions to be performed upon notification of the event occurrence, wherein said apparatus further comprises:

means for setting the window size for said SIP-like protocol stream to one packet if the number of SMS timeouts exceeds a timeout threshold, or if the number of unacknowledeged reports is greater than an "Unack" threshold; and means for doubling the window size of said SIP-like protocol stream if the number of SMS timeouts does not exceed said timeout threshold and if the number of unacknowledged reports is not greater than said "Unack" threshold.

19. An apparatus for transporting dynamic presence information over a wireless and wireline communications network, the apparatus comprising:
a memory; and
a presence client in communication with a client device and configured to:
send dynamic presence information related to user interaction with a client device and a presence configuration of said client device from said client device to a gateway using a SIP-like protocol, said SIP-like protocol based at least in part on the SIP protocol, said SIP-like protocol employing a transport protocol; and
receive dynamic presence information from said gateway using said SIP-like protocol,
wherein said presence configuration defines information to be provided to the gateway, information of an event that is subscribed to, and one or more actions to be performed upon notification of the event occurrence,
wherein said presence client is further configured to:
pass a measurement of said SIP-like protocol streaming rate and a current bandwidth measurement through a low pass filter;
set an exponent to a threshold value if said filtered streaming rate measurement is not greater than said filtered bandwidth value; and
delay based at least in part on the value $2^{exponent}$ and increase said exponent if said filtered streaming rate measurement is greater than said filtered bandwidth value.

20. The apparatus of claim 19 wherein said SIP-like protocol comprises:
an "Options" method for querying the media capabilities of a client device;
a "Register" method for providing dynamic presence information from said client device to a presence agent;
a "Subscribe" method for subscribing to an event for notification upon the occurrence of said event;
a "Notify" method for informing said subscriber about the state of an event that has been subscribed to.

21. The apparatus of claim 20 wherein said SIP-like protocol further comprises a "Message" method for sending an instant message to a principal.

22. The apparatus of claim 19 wherein said transport protocol comprises Short Message Service (SMS).

23. The apparatus of claim 19 wherein said transport protocol comprises Unstructured Supplementary Services Data (USSD).

24. An apparatus for transporting dynamic presence information over a wireless and wireline communications network, the apparatus comprising:
a memory; and
a presence client in communication with a client device and configured to:
send dynamic presence information related to user interaction with a client device and a presence configuration of said client device from said client device to a gateway using a SIP-like protocol, said SIP-like protocol based at least in part on the SIP protocol, said SIP-like protocol employing a transport protocol; and
receive dynamic presence information from said gateway using said SIP-like protocol,
wherein said presence configuration defines information to be provided to the gateway, information of an event that is subscribed to, and one or more actions to be performed upon notification of the event occurrence,
wherein said presence client is further configured to:
set the window size for said SIP-like protocol stream to one packet if the number of SMS timeouts exceeds a timeout threshold, or if the number of unacknowledeged reports is greater than an "Unack" threshold; and
double the window size of said SIP-like protocol stream if the number of SMS timeouts does not exceed said timeout threshold and if the number of unacknowledeged reports is not greater than said "Unack" threshold.

25. The apparatus of claim 19 wherein said apparatus comprises a smart card.

26. The apparatus of claim 25 wherein said smart card comprises a technology-enabled smart card.

27. The apparatus of claim 25 wherein said smart card comprises a CDMA (Code Division Multiple Access) technology-enabled smart card.

28. The apparatus of claim 25 wherein said smart card comprises a SIM (Subscriber Identity Module) card.

29. The apparatus of claim 25 wherein said smart card comprises a WIM (Wireless Interface Module).

30. The apparatus of claim 25 wherein said smart card comprises a USIM (Universal Subscriber Identity Module).

31. The apparatus of claim 25 wherein said smart card comprises a UIM (User Identity Module).

32. The apparatus of claim 25 wherein said smart card comprises a R-UIM (Removable User Identity Module).

33. A method for transporting information over a communications network, comprising:
sending information in a first device to a second device over a network using a SIP-like protocol;
passing a measurement of the SIP-like protocol streaming rate and a current bandwidth measurement through a low pass filter;
setting an exponent to a threshold value if said filtered streaming rate measurement is not greater than said filtered bandwidth value; and
delaying based at least in part on the value $2^{exponent}$ and increasing said exponent if said filtered streaming rate measurement is greater than said filtered bandwidth value.

34. The method of claim 33, wherein the SIP-like protocol employs one of a USSD transport protocol or a SMS transport protocol.

35. A method for transporting information over a communications network, comprising:
sending information in a first device to a second device over a network using a SIP-like protocol;
setting the window size for said SIP-like protocol stream to one packet if the number of SMS timeouts exceeds a timeout threshold, or if the number of unacknowledged reports is greater than an "Unack" threshold; and
doubling the window size of said protocol stream if the number of packet timeouts does not exceed said timeout threshold and if the number of unacknowledged reports is not greater than said "Unack" threshold.

36. A program storage device readable by a machine, the program storage device embodying a program of instructions executable by the machine to perform a method for transporting information over a communications network, comprising:
sending information in a first device to a second device over a network using a SIP-like protocol;

passing a measurement of the SIP-like protocol streaming rate and a current bandwidth measurement through a low pass filter;

setting an exponent to a threshold value if said filtered streaming rate measurement is not greater than said filtered bandwidth value; and delaying based at least in part on the value $2^{exponent}$ and increasing said exponent if said filtered streaming rate measurement is greater than said filtered bandwidth value.

37. The method of claim 36, wherein the SIP-like protocol employs one of a USSD transport protocol and a SMS transport protocol.

38. A program storage device readable by a machine, the program storage device embodying a program of instructions executable by the machine to perform a method for transporting information over a communications network, comprising:

sending information in a first device to a second device over a network using a SIP-like protocol;

setting the window size for said SIP-like protocol stream to one packet if the number of SMS timeouts exceeds a timeout threshold, or if the number of unacknowledged reports is greater than an "Unack" threshold; and doubling the window size of said protocol stream if the number of packet timeouts does not exceed said timeout threshold and if the number of unacknowledged reports is not greater than said "Unack" threshold.

* * * * *